US012775231B2

(12) United States Patent
Takagi

(10) Patent No.: US 12,775,231 B2
(45) Date of Patent: Oct. 27, 2026

(54) SHEET THERMOCOMPRESSION APPARATUS AND MULTIFUNCTION DEVICE

(71) Applicant: CANON KABUSHIKI KAISHA, Tokyo (JP)

(72) Inventor: Kenji Takagi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 18/767,172

(22) Filed: Jul. 9, 2024

(65) Prior Publication Data

US 2025/0021039 A1 Jan. 16, 2025

(30) Foreign Application Priority Data

Jul. 13, 2023 (JP) ................................. 2023-114879

(51) Int. Cl.
*G03G 15/00* (2006.01)
*B42C 1/12* (2006.01)
(Continued)

(52) U.S. Cl.
CPC ........... *G03G 15/5012* (2013.01); *B42C 1/12* (2013.01); *B42C 9/0093* (2013.01); *B65H 37/04* (2013.01);
(Continued)

(58) Field of Classification Search
CPC ........... G03G 15/5012; G03G 15/6529; G03G 15/6544; G03G 15/6585;
(Continued)

(56) References Cited

U.S. PATENT DOCUMENTS

| | | | | |
|---|---|---|---|---|
| 4,343,667 A * | 8/1982 | Hollis | ................... | B29C 66/435 156/266 |
| 6,616,135 B1 * | 9/2003 | Shida | .................... | B42C 9/0006 412/37 |

(Continued)

FOREIGN PATENT DOCUMENTS

| | | |
|---|---|---|
| JP | 2005096202 A | 4/2005 |
| JP | 2006259329 A | 9/2006 |
| JP | 2014237291 A | 12/2014 |
| JP | 2020121512 A | 8/2020 |
| JP | 2022089399 A | 6/2022 |

*Primary Examiner* — David H Banh
(74) *Attorney, Agent, or Firm* — ROSSI, KIMMS & McDOWELL LLP

(57) ABSTRACT

A sheet thermocompression apparatus for bonding a plurality of the sheets to one another, and configured to be compatible with the sheets with a plurality of prescribed sizes. The apparatus includes a loading portion to be loaded with the bundle of sheets each including the adhesion layer formed thereon and a thermocompression unit. The thermocompression unit includes (i) a pressing member pressing the bundle of sheets loaded on the loading portion in a loading direction of the sheets, a longitudinal direction of the pressing member is a direction along one edge of the sheets loaded on the loading portion, (ii) a heating source heating the pressing member, and (iii) a temperature measuring sensor arranged at a position not overlapping a minimum sheet with a minimum size of the prescribed sizes loaded on the loading portion in the loading direction, and detects a temperature of the heating source.

16 Claims, 15 Drawing Sheets

(51) Int. Cl.

| | |
|---|---|
| ***B42C 9/00*** | (2006.01) |
| ***B65H 37/04*** | (2006.01) |
| ***H05B 1/02*** | (2006.01) |

(52) U.S. Cl.

CPC ..... *G03G 15/6529* (2013.01); *G03G 15/6544* (2013.01); *G03G 15/6585* (2013.01); *H05B 1/0241* (2013.01); *B65H 2301/51614* (2013.01); *G03G 2215/00835* (2013.01); *G03G 2215/00848* (2013.01); *G03G 2215/00936* (2013.01)

(58) Field of Classification Search

CPC .......... G03G 2215/00835; G03G 2215/00848; G03G 2215/00936; B42C 1/12; B42C 9/0093; B65H 37/04; B65H 2301/51614; H05B 1/0241

See application file for complete search history.

(56) References Cited

U.S. PATENT DOCUMENTS

| | | | | |
|---|---|---|---|---|
| 11,703,780 | B2 | 7/2023 | Seshita et al. | |
| 2005/0185977 | A1* | 8/2005 | Kamei | G03G 15/2042 399/69 |
| 2008/0246205 | A1* | 10/2008 | Fujii | B41L 43/12 270/58.08 |
| 2008/0308992 | A1* | 12/2008 | Hommochi | B65H 37/04 270/58.08 |
| 2011/0052294 | A1* | 3/2011 | Min | B65H 29/26 399/408 |
| 2013/0051886 | A1* | 2/2013 | Watanabe | G03G 15/6544 399/409 |
| 2020/0189307 | A1* | 6/2020 | Okamoto | B42C 9/0006 |
| 2023/0266699 | A1* | 8/2023 | Shoji | G03G 15/2039 399/69 |

* cited by examiner

SHEET THERMOCOMPRESSION APPARATUS AND MULTIFUNCTION DEVICE

BACKGROUND OF THE INVENTION

Field of the Invention

The present invention relates to a sheet thermocompression apparatus and a multifunction device including the sheet thermocompression apparatus.

Description of the Related Art

Conventionally, there is known a method in which a plurality of sheets subjected to an image forming treatment by an image forming apparatus is subjected to an adhesion treatment by remelting an adhesion layer (adhesion toner) on the sheet by a sheet thermocompression apparatus, thereby manufacturing a booklet. The booklet manufactured by adhesion with the adhesion toner does not use a needle made of a metal such as a stapler, and hence has a large advantage in terms of safety. Further, a necessity of removing a needle made of a metal or the like is eliminated also in the cutting treatment by a shredder or the like. For this reason, the convenience of a user can be improved.

Japanese Patent Application Publication No. 2014-237291 discloses the configuration in which an image forming apparatus forms an image printing toner on a sheet, and at the same time, an adhesion toner is formed at the binding position on the sheet. Then, the sheet bundle including a plurality of sheets each having the adhesion toner formed thereon is heated and pressurized by a thermocompression unit of a sheet thermocompression apparatus, to be subjected to an adhesion treatment.

SUMMARY OF THE INVENTION

In the sheet thermocompression apparatus as described above, thermocompression unit is configured so as to include a pressing member for coming in contact with a sheet, and pressing the sheet, and a heating source for heating the pressing member. Then, when the sheet thermocompression apparatus is configured to be compatible with sheets with a plurality of prescribed sizes, for the thermocompression unit, generally, the dimension in the longitudinal direction along one side of the sheet is determined in accordance with the sheet with the maximum size of the prescribed sizes.

A study by the present inventors revealed the following. When thermocompression unit presses a sheet with a smaller size than the maximum size, stress concentration is caused at the boundary portion between the pressurizing region receiving a reaction force from the sheet and the non-pressurizing region not to come in contact with a sheet of the pressing surface of the pressing member. Then, the pressing member is deformed by the stress concentration, so that a site reduced in heat conductivity may be generated between the pressing member and the heating source. The reduction of the heat conductivity from the heating source to the pressing member causes an excessive increase in temperature of the heating source. This may lead to the quality deterioration of the booklet manufactured by the thermocompression operation, and the breakdown of the thermocompression unit, or the like.

The present invention has been completed in view of the foregoing problem. It is an object of the present invention to provide a sheet thermocompression apparatus capable of executing a stable thermocompression operation.

In order to achieve the object described above, a sheet thermocompression apparatus for bonding a plurality of sheets to one another, and configured to be compatible with the sheets with a plurality of prescribed sizes, the sheet thermocompression apparatus comprising:

a loading portion to be loaded with the bundle of sheets each including the adhesion layer formed thereon; and a thermocompression unit including (i) a pressing member pressing the bundle of sheets loaded on the loading portion in a loading direction of the sheets, a longitudinal direction of the pressing member is a direction along one edge of the sheets loaded on the loading portion, (ii) a heating source heating the pressing member, and (iii) a temperature measuring sensor arranged at a position not overlapping a minimum sheet with a minimum size of the prescribed sizes loaded on the loading portion in the loading direction, and detects a temperature of the heating source.

The present invention can provide a sheet thermocompression apparatus capable of executing a stable thermocompression operation.

BRIEF DESCRIPTION OF THE DRAWINGS

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments. In addition, not all features described in the following embodiments are essential to solutions provided by the invention.

A sheet thermocompression apparatus of the present invention is preferable particularly for a sheet thermocompression apparatus for manufacturing a booklet including a plurality of sheets bonded to one another. Below, as one example of the sheet thermocompression apparatus to which the present invention was applied, a description will be given to a sheet thermocompression apparatus connected with an image forming apparatus for forming an image on a sheet, and included in a post treatment apparatus to which the sheet is conveyed from the image forming apparatus.

Example 1

Image Forming Apparatus

Figure 1:
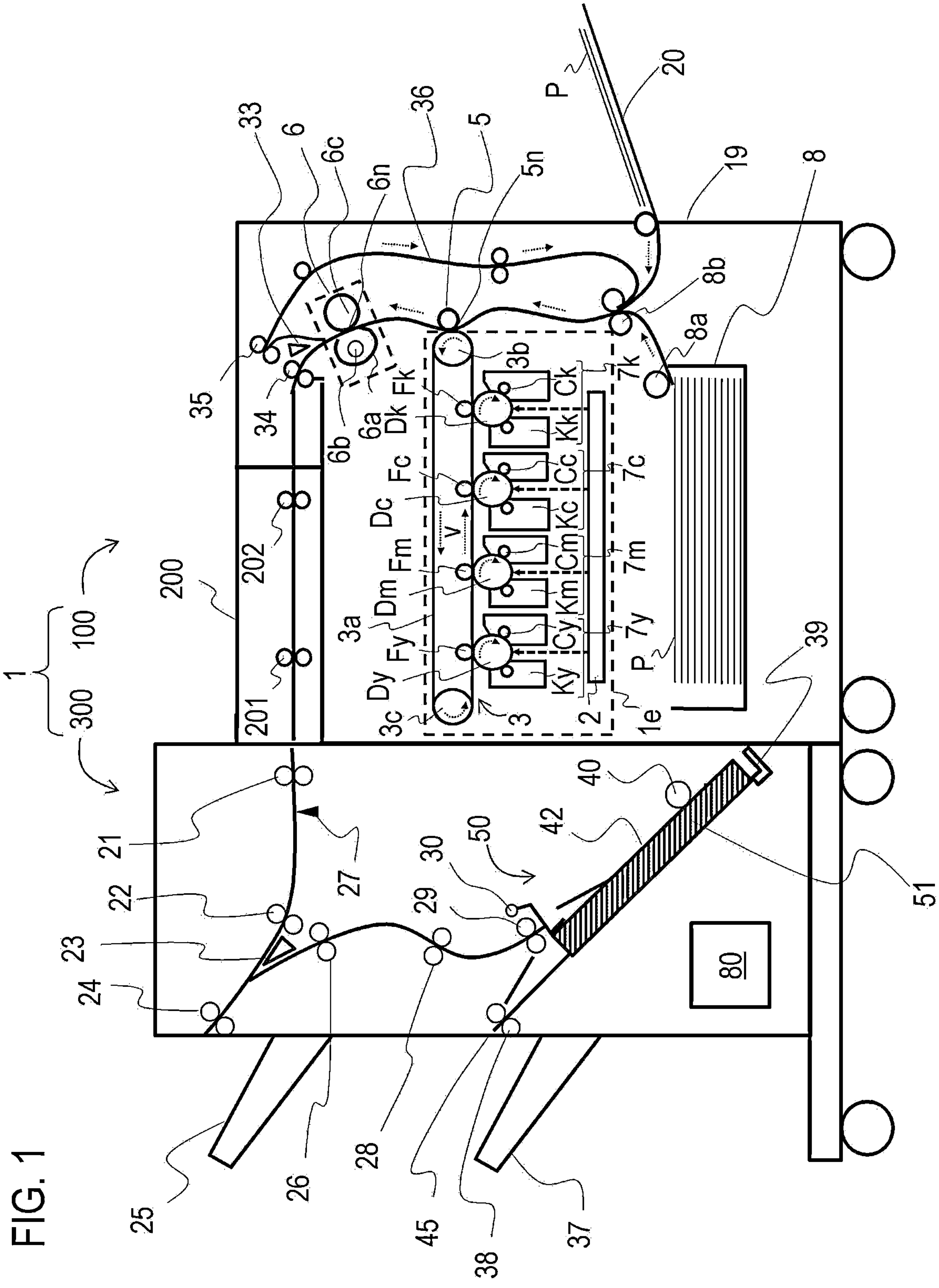
FIG. 1 is a schematic cross sectional view of an image forming apparatus and a post treatment apparatus of Example 1.

FIG. 1 is a schematic cross sectional view showing a schematic configuration of a multifunction device 1 including an image forming apparatus 100 in accordance with Example 1, and a post treatment apparatus 300 connected with the image forming apparatus 100. First, the overall configuration of the image forming apparatus 100 in accordance with Example 1 will be described by reference to FIG. 1. The image forming apparatus 100 is a laser printer using an electrophotographic recording system. Incidentally, in Example 1, the post treatment apparatus 300 is described as an apparatus independent of the image forming apparatus 100. The post treatment apparatus 300 may be regarded as one apparatus configuring the image forming apparatus 100. Alternately, the image forming apparatus 100 may be another image forming apparatus using an electrophotographic recording system such as a copier or a facsimile.

As shown in FIG. 1, the image forming apparatus 100 includes a sheet cassette 8 for accommodating a sheet P as a recording material (recording medium), an image forming unit 1*e* (in the frame of a broken line) as an image forming means, a fixing apparatus (fixing unit) 6 as a fixing means, and a housing 19 for accommodating these. The image forming apparatus 100 has a printing function of forming a toner image on a sheet P fed from the sheet cassette 8 by the image forming unit 1*e*, and performing a fixing treatment thereon by the fixing apparatus 6 for providing a printed matter.

In Example 1, the image forming apparatus 100 is configured in such a manner as to be able to form an image on the sheets P with a plurality of prescribed sizes. The maximum size of the sheets P on each of which an image can be formed with the image forming apparatus 100 is a A4 size (297 mm in length×210 mm in width), and the minimum size is a A5 size (210 mm in length×149 mm in width). The image forming apparatus 100 conveys the sheet P in the vertical direction (the orientation in which the longitudinal direction is in parallel with the conveyance direction), and performs image formation. The sheet conveyance speed of the image forming apparatus 100 is 300 mm/sec.

The sheet cassette 8 is inserted extractably with respect to the housing 19 of the image forming apparatus 100 at the lower portion of the image forming apparatus 100, and is configured in such a manner as to be able to accommodate a large number of sheets P. Th sheet P accommodated in the sheet cassette 8 is fed from the sheet cassette 8 by a paper feed roller 8*a* as a paper feed portion, and is conveyed by a conveying roller pair 8*b*. Further, the image forming apparatus 100 further includes a multi-tray 20, and can also feed the sheets P set in the multi-tray 20 one by one.

The image forming unit 1*e* is a tandem type electrophotographic system unit including 4 process cartridges 7*y*, 7*m*, 7*c*, and 7*k*, a scanner unit 2, and a transfer unit 3. Below, when respective process cartridges 7*y*, 7*m*, 7*c*, and 7*k* are not required to be distinguished, they will be collectively referred to as a process cartridge 7 for description. Further, the same should also apply to the member provided at each process cartridge 7 such as a photosensitive drum D.

The process cartridge 7 is configured by unitizing a plurality of components for performing an image forming process integrally and interchangeably. Respective process cartridges 7*y*, 7*m*, 7*c*, and 7*k* include photosensitive drums D (Dy, Dm, Dc, and Dk), i.e., image bearing members, and charging rollers C (Cy, Cm, Cc, and Ck), i.e., charging devices for charging the photosensitive drums D. Further, respective process cartridges 7*y*, 7*m*, 7*c*, and 7*k* include toner accommodating portions K (Ky, Km, Kc, and Kk) for accommodating a toner, and supplying the toner to the photosensitive drums D, respectively. The toner accommodating portion K is provided with a development roller for supplying a toner to the photosensitive drums D. Respective process cartridges 7*y*, 7*m*, 7*c*, and 7*k* have a substantially common configuration except for the kind of the toner to be accommodated in the 4 toner accommodating portions Ky, Km, Kc, and Kk.

In the toner accommodating portions Ky, Km, Kc, and Kk, the toners of a yellow toner, a magenta toner, a cyan toner, and a black toner for forming a visible image on a sheet P are accommodated, respectively. In Example 1, the black toner is also used as an adhesion toner as a powder adhesive for performing a crimp treatment after printing. Namely, in Example 1, the black toner deposited on the sheet can function as the adhesion layer for bonding the plurality of sheets to one another. Incidentally, in Example 1, the black toner was set as a toner for a combination of visible image formation and adhesion. However, any of other color toners (yellow, magenta, and cyan) may be set as the toner for a combination of visible image formation and adhesion. Alternatively, it is also acceptable that a transparent toner is formed without including a pigment therein, and the toner is used for adhesion use.

A scanner unit 2 is an exposure means arranged under the process cartridges 7 and above the sheet cassette 8. The scanner unit 2 applies a laser light to the photosensitive drum D of each process cartridge 7, and forms an electrostatic latent image. Incidentally, the exposure means of the image forming apparatus 100, i.e., an electrophotographic system is not limited to the foregoing configuration.

A transfer unit 3 includes a transfer belt 3*a* as an intermediate transfer member (secondary image bearing member). The transfer belt 3*a* is a belt member stretched over a secondary transfer inner roller 3*b* and a stretching roller 3*c*, and has an outer circumferential surface opposed to the photosensitive drums D. On the inner circumferential side of the transfer belt 3*a*, first transfer rollers Fn, Fy, Fm, and Fc are arranged at positions corresponding to respective photosensitive drums Dn, Dy, Dm, and Dc, respectively.

Further, at a position opposed to the secondary transfer inner roller 3*b* via the transfer belt 3*a*, a secondary transfer roller 5 as a transfer means is arranged. A transfer nip 5*n* formed between the secondary transfer roller 5 and the transfer belt 3*a* is a transfer portion (secondary transfer portion) for transferring a toner image from the transfer belt 3*a* onto the sheet P. A fixing apparatus 6 is arranged above the secondary transfer roller 5.

The fixing apparatus 6 is a fixing portion for conveying the sheet P while heating and melting the toner image on the sheet P. The fixing apparatus 6 has a tubular fixing film 6*a* as a heating rotating member, a pressure roller 6*c* as a pressurizing member for pressurizing the fixing film 6*a*, and a heater 6*b* for coming in contact with the inner surface of the fixing film 6*a* for heating. The pressing force of the pressure roller 6*c* forms the fixing nip 6*n* between the fixing film 6*a* and the pressure roller 6*c*.

Image Forming Operation

Then, a description will be given to the image forming operation of the image forming apparatus 100. When data of an image to be printed and an execution instruction of print are inputted to the image forming apparatus 100, a control portion of the image forming apparatus 100 starts a series of operations of conveying a sheet P, and forming an image on the sheet P (a conveyance operation by each conveyance means an image forming operation). FIG. 1 indicates the conveyance direction of the sheet P and the driving direction of each member with a dotted line.

With the image forming operation, first, the sheets P are fed one by one from the sheet cassette 8, and are conveyed toward the transfer nip 5*n* via the conveying roller pair 8*b*. In parallel with feeding of the sheets P, respective process cartridges 7 are successively driven, so that the photosensitive drum D is rotatively driven. At this step, the photosensitive drum D is given a uniform electric charge on the surface by a charging roller C. Further, the scanner unit 2 applies a laser light modulated on the basis of the image data to the photosensitive drum D of each process cartridge 7, and forms an electrostatic latent image on the surface of the photosensitive drum D. Then, the toner borne on the development roller in the toner accommodating portion K of each process cartridge 7 develops the electrostatic latent image on the photosensitive drum D as a toner image.

The transfer belt 3*a* rotates in the counterclockwise direction (arrow v direction) in FIG. 1. The toner image formed at each process cartridge 7 is primarily transferred from the photosensitive drum D to the transfer belt 3*a* by the electric field formed between the photosensitive drum D and the first transfer roller F.

The toner image borne on the transfer belt 3*a* which has reached the transfer nip 5*n* is secondarily transferred to the conveyed sheet P by the electric field formed between the secondary transfer roller 5 and the secondary transfer inner roller 3*b*.

Subsequently, the sheet P is conveyed to the fixing apparatus 6, and undergoes a heat fixing treatment. Namely, when the sheet P passes through the fixing nip 6*n*, the toner image on the sheet P is heated and pressurized, so that the printing toner is molten, followed by fixing, resulting in an image fixed on the sheet P.

At downstream in the conveyance direction of the sheet P of the fixing nip 6*n*, a switching guide 33, i.e., a guide member for switching the conveyance direction of the sheet P is set. The conveyance direction of the sheet P is switched according to any selected print mode of the one side print mode of forming an image only on one surface of the sheet P, and the both side print mode of forming an image on each opposite surface of the sheet P.

In the case of the one side print mode, the switching guide 33 guides the sheet P to the paper output roller pair 34 side. The sheet P guided to the paper output roller pair 34 side by the switching guide 33 reaches the post treatment apparatus 300 via an intermediate conveyance unit 200 having conveying roller pair 201 and 202, resulting in completion of a series of image forming operations of the image forming apparatus 100.

On the other hand, in the case of the both side print mode, the switching guide 33 guides the sheet P to the switchback roller pair 35 side. Then, the switchback roller pair 35 discharges the sheet P to the rear end in the conveyance direction, and then, reverses the rotation direction, thereby conveying the sheet P to the both surface conveyance path 36 side for both surface printing.

The sheet P conveyed to the both surface conveyance path 36 passes through the secondary transfer portion and the fixing apparatus 6 again. In the process, an image is formed on the unprinted sheet surface of the sheet P. Then, the switching guide 33 guides the sheet P to the paper output roller pair 34 side. The sheet P reaches the post treatment apparatus 300 via the intermediate conveyance unit 200.

The post treatment apparatus 300 of Example 1 has a floor standing type configuration. The post treatment apparatus 300 mounts therein a conveyance mechanism for conveying the sheet P, a sheet adjustment mechanism provided at the apparatus lower portion, and a booklet manufacturing apparatus 50 provided with a thermocompression unit 51 for heating and pressurizing the adjusted sheet bundle for a prescribed time. The booklet manufacturing apparatus 50 is a sheet thermocompression apparatus for heating and pressurizing the adjusted sheet bundle, thereby bonding a plurality of sheets to one another. In Example 1, the sheet conveyance speed by the intermediate conveyance unit 200, and the conveyance mechanism of the post treatment apparatus 300 is 600 mm/sec.

Post Treatment Apparatus

Subsequently, a description will be given to the operation of the post treatment apparatus 300. The sheet P conveyed from the intermediate conveyance unit 200 is delivered to the conveying roller pair 21 of the post treatment apparatus 300. On the downstream side in the conveyance direction of the conveying roller pair 21, an inlet sensor 27 for detecting the passage of the sheet P is provided. A conveyance roller 22 provided on the downstream side in the conveyance direction of the inlet sensor 27 accelerates the sheet P at a prescribed timing on the basis of the rear end passage time detected by the inlet sensor 27. The post treatment apparatus 300 is provided with a paper output upper tray 25 and a paper output lower tray 37 situated below the paper output upper tray 25 as the discharge destinations of the sheet P.

When the discharge destination of the sheet P is the paper output upper tray 25, at the stage at which the sheet rear end (the rear end in the conveyance direction of the sheet P) reaches between the conveyance roller 22 and an inversion roller 24, the sheet P is slowed down to a prescribed paper discharge speed, to be discharged into the paper output upper tray 25.

When the discharge destination of the sheet P is the paper output lower tray 37, at the timing at which the sheet rear end passes through a backflow check valve 23 provided on the downstream side in the conveyance direction of the conveyance roller 22, sheet conveyance is once stopped, and the sheet P is switched back, and is conveyed to an inner paper output roller 26. The backflow check valve 23 is forced clockwise in FIG. 1 by a spring not shown.

The sheet P conveyed from the inner paper output roller 26 is fed to a kicking roller 29 via an intermediate conveyance roller 28, and is conveyed to an intermediate loading portion 42 in the booklet manufacturing apparatus 50. A vertical adjustment reference sheet 39 is arranged at the most downstream portion of the intermediate loading portion 42. The end in the conveyance direction of the sheet P is hit against the vertical adjustment reference sheet 39 by a half-moon roller 40. As a result, alignment of the sheet bundle is performed.

Sheet Adjustment Method

Next, a description will be given to the method for adjusting the sheets P at the sheet adjusting portion in the booklet manufacturing apparatus 50 by reference to FIGS. 2A to 2E. FIGS. 2A to 2E are each an explanatory view of the method for adjusting the sheets P by the sheet adjustment mechanism of the booklet manufacturing apparatus 50, and is a view of the intermediate loading portion 42 as seen from the direction perpendicular to the mounting surface of the sheet P. Below, a description will be given assuming that Y direction represents the vertical direction of the conveyance direction of the sheet P by the kicking roller 29, the X direction represents the transverse direction of the width direction of the sheet P, and the Z direction represents the loading direction (the height direction of the sheet bundle) in which the sheets P are loaded.

Figures 2A, 2B, 2C, 2D, 2E:
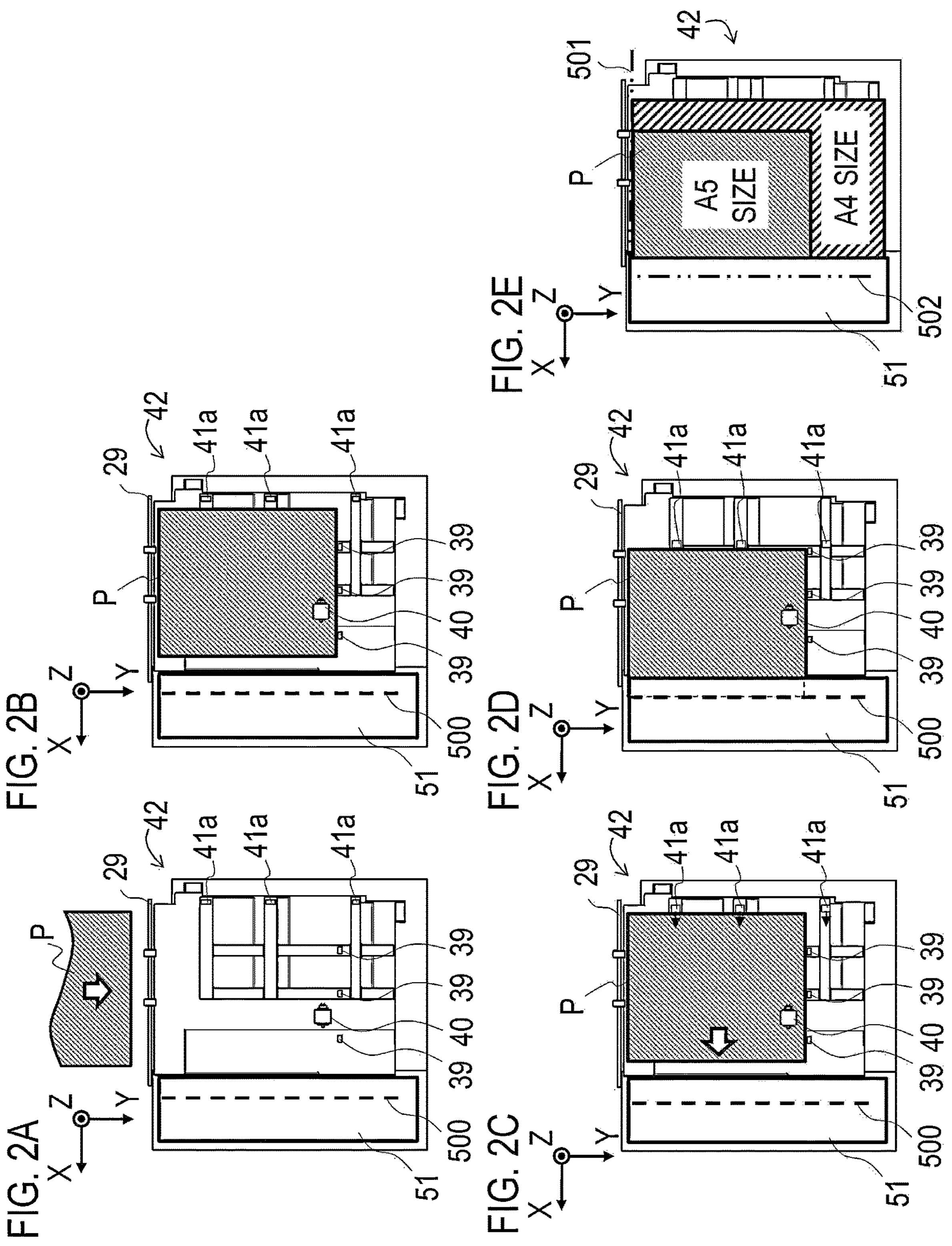
FIGS. 2A to 2E are each an explanatory view of a method for adjusting sheets of the post treatment apparatus of Example 1.

FIG. 2A shows the state in which the sheet P is conveyed to the intermediate loading portion 42. The sheet P is conveyed to the intermediate loading portion 42 by the kicking roller 29. The intermediate loading portion 42 is provided with the vertical adjustment reference sheet 39 for adjusting the position in the vertical direction (Y direction) of the sheet P, and the half-moon roller 40 for pressing the sheet P against the vertical adjustment reference sheet 39.

The vertical adjustment reference sheet 39 is a regulating member for regulating the movement in the vertical direction (Y direction) of the sheet P. By pressing the end in the vertical direction of the sheet P against the vertical adjustment reference sheet 39, the sheets P are aligned. Further, the vertical adjustment reference sheet 39 is configured movably in the vertical direction, so that the adjustment position can be changed according to the size of the sheets P to be adjusted. The half-moon roller 40 is rotatably supported, and conveys the sheets P toward the vertical adjustment reference sheet 39 at a prescribed timing.

FIG. 2B shows the state in which the end in the vertical direction of the sheet P is hit against the transverse adjustment reference sheet 52. After the sheet P comes in contact with the vertical adjustment reference sheet 39, the conveyance pressure of the half-moon roller 40 is adjusted so that the half-moon roller 40 may slip on the sheet P.

The intermediate loading portion 42 is provided with the transverse adjustment reference sheet 500 for adjusting the position in the transverse direction (X direction) of the sheet P, and a transverse adjustment jogger 41*a* for pressing the sheet P against the transverse adjustment reference sheet 500. The transverse adjustment reference sheet 500 is a member for regulating the movement in the transverse direction of the sheet P. By pressing the end in the transverse direction of the sheet P against the transverse adjustment reference sheet 500, the sheets P are aligned. FIG. 2C shows the state in which the sheet P is pressed against the transverse adjustment reference sheet 500 provided at the intermediate loading portion 42. The sheet P hit against the vertical adjustment reference sheet 39 is pressed to the left side in FIG. 2C toward the transverse adjustment reference sheet 500 by the transverse adjustment jogger 41*a* set movably in the transverse direction.

FIG. 2D shows the state in which the end in the transverse direction of the sheet P is hit against the transverse adjustment reference sheet 500. The sheets P pressed to the left side in FIG. 2C by the transverse adjustment jogger 41*a* is hit against the transverse adjustment reference sheet 500 indicated with a dotted line in FIGS. 2A to 2D. As a result, the sheets P are aligned with high precision in both the transverse direction and the vertical direction, and further is loaded onto the intermediate loading portion 42.

In Example 1, the alignment operation of the sheets P shown in FIGS. 2C and 2D is performed collectively for every four sheets in linkage with the binding operation by the thermocompression unit 51 provided at the intermediate loading portion 42. The thermocompression unit 51 is a sheet adhesion means for subjecting a plurality of sheets P to a thermocompression treatment, and thereby manufacturing a sheet bundle with the left end bound or the right end bound.

The plurality of sheets P aligned in the vertical direction and the transverse direction are subjected to a heating pressurizing treatment by the thermocompression unit 51. As a result, a sheet bundle (booklet) aligned with high precision by the booklet manufacturing apparatus 50 is manufactured.

The post treatment apparatus 300 of Example 1 is configured in such a manner as to be compatible with the sheets P with a plurality of prescribed sizes as with the image forming apparatus 100. The post treatment apparatus 300 is configured to be able to manufacture booklets with a plurality of different sheet sizes (A4 and A5). The maximum adaptable sheet size is A4 (297 mm in length and 210 mm in width), and the minimum sheet size is A5 (210 mm in length and 148 mm in width). The vertical adjustment reference sheet 39, the half-moon roller 40, and the transverse adjustment jogger 41*a* are operated in accordance with respective sheet sizes. As a result, the sheets P are adjusted so that the longitudinal end of the sheet P may be situated at a vertical adjustment reference position 501, and so that the transverse end may be situated at a transverse adjustment reference position 502. Incidentally, the transverse adjustment reference position 502 is the end face of the transverse adjustment reference sheet 500. FIG. 2E shows the arrangement position of the sheet P at the time of an adjustment treatment with each sheet size (A4 or A5), and indicates the vertical adjustment reference position 501 and the transverse adjustment reference position 502 with a dashed-and-double-dotted line.

Heating Unit

Figure 3A:
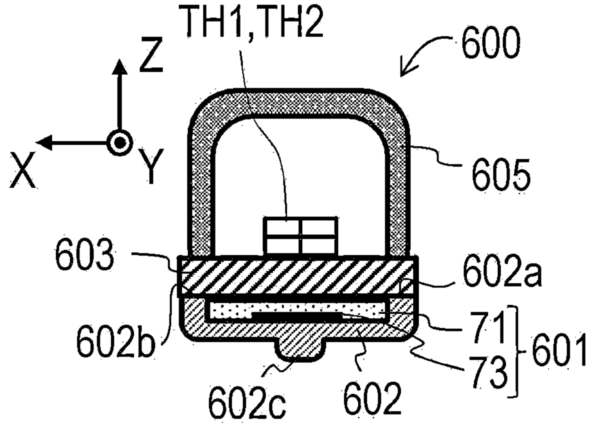
FIGS. 3A and 3B are each a schematic cross sectional view showing the configuration of a heating unit of Example 1.
Figure 3B:
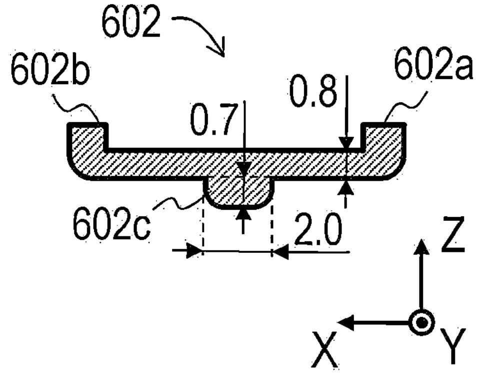

Next, a description will be given to the structure of a heating unit 600 of the thermocompression unit 51. FIGS. 3A and 3B are each an explanatory view showing the configuration of the heating unit 600. The heating unit 600 is a heating means for heating the bundle of the sheets P at the thermocompression operation of the sheets P, and is a pressurizing means for pressurizing the bundle of sheets P.

FIG. 3A is a schematic cross sectional view of the heating unit 600 in accordance with Example 1 as seen in the Y direction. The heating unit 600 has a ceramic heater 601 as a heating source, a heating sheet 602 as a pressing member for heating and pressurizing the bundle of the sheets P loaded on the intermediate loading portion 42, a heater support 603 for supporting the heating sheet 602, and a metal stay 605 as a rigid body. The heating unit 600 internally includes the ceramic heater 601 of a planar heat generator, and the heating sheet 602 is in close contact with the ceramic heater 601. All of the ceramic heater 601, the heating sheet 602, and the heater support 603 are each a long and narrow member with the direction (Y direction) along one side in the vertical direction of the sheet P loaded on the intermediate loading portion 42 as the longitudinal direction. With such a configuration, the heating unit 600 heats and pressurizes the entire edge along the one side of the sheet P.

The ceramic heater 601 has a ceramic base material 71 as a substrate including $Al_2O_3$ (alumina) as the main component, and a heat generator 73 provided on the ceramic base material 71. The dimensions of the ceramic base material 71 of the ceramic heater 601 are 1.0 mm in thickness, 8.0 mm in width, and 350 mm in length, and the thermal conductivity λh is 22 W/mK. Herein, the thermal conductivity λh was measured by a thermal conductivity measuring apparatus (ai-Phase Mobile 2, ai-Phase Co., Ltd.). Further, the Young's modulus of the ceramic base material 71 of the ceramic heater 601 is 370 GPa.

The heating sheet 602 has adhesion portions **602*a* and 602*b* to be subjected to an adhesion treatment over the entire region in the Y direction with respect to the heater support 603 by a heat resistant silicone adhesive. The adhesion portion 602*a* extends in the Y direction at one end in the X direction of the heating sheet 602, and the adhesion portion 602*b* extends in the Y direction at the other end in the X direction of the heating sheet 602. Further, the ceramic heater 601 is provided between the adhesion portion 602*a* and the adhesion portion 602*b*** in the X direction.

The material for the heater support 603 is a heat resistant resin, and in Example 1, LCP (Liquid Cristal Polymer) was used.

The heating unit 600 is provided with a temperature detection means for detecting the temperature of the ceramic heater 601. The temperature detection means of Example 1 include thermistors TH1 and TH2 as temperature measuring sensors. The thermistors TH1 and TH2 are supported by the heater support 603, and is provided on the surface of the heater support 603 opposite to the adhesion surface thereof with the adhesion portions **602*a* and 602*b*. In Example 1, as the thermistors TH1 and TH2**, a resistor having the NTC characteristic (Negative Temperature Coefficient) was used. However, the configuration of the temperature detection means is not limited thereto. For example, as the temperature detection means, a resistor having a PTC characteristic (Positive Negative Temperature Coefficient), various thermocouples and radiation thermometers may be used.

The booklet manufacturing apparatus 50 is provided with a control portion 80 (see FIG. 1) for controlling the temperature of the heat generator 73 of the ceramic heater 601. The control portion 80 is configured so as to be able to adjust the temperature of the heat generator 73 on the basis of the measurement results (detected temperatures) of the thermistors TH1 and TH2. The control portion 80 may be configured so as to be able to execute only control of the thermocompression unit 51, or may be configured so as to be able to also control the operations of respective rollers of the post treatment apparatus 300, and the like collectively.

The heating sheet 602 has a pressurizing portion **602*c* protruding downward in the Z direction, and presses the sheet bundle by the pressurizing portion 602*c* at the thermocompression operation. The heating sheet 602 is provided with the pressurizing portion 602*c*. This enables concentration of the heat and the pressure of the heating unit 600** only to the binding position of the sheet bundle, so that the heating and pressurizing treatment can be performed with efficiency.

FIG. 3B is a schematic cross sectional view of the heating sheet 602 of the heating unit 600 as seen in the Y direction, and shows the shape of the heating sheet 602. For the heating sheet 602 of Example 1, an aluminum material (A6063 material) is used as the main component. The heating sheet 602 is configured with a thickness of 0.8 mm, and the pressurizing portion A protrudes 0.7 mm downward with a width of 2.0 mm. Whereas, the length in the Y direction of the heating sheet 602 is 300 mm. The thermal conductivity λp of the heating sheet 602 in accordance with Example 1 is 237 W/mK, and the Young's modulus is 68 GPa. By using a highly thermally conductive material such as aluminum (A6063 material) for the heating sheet 602, it becomes easy to transfer the heat of the ceramic heater 601 serving as a heating source to the sheet P. Therefore, the thermal conductivity λp of the heating sheet 602 is preferably equal to or higher than at least the thermal conductivity λh of the ceramic heater 601.

Thermocompression Operation

Figure 4B:
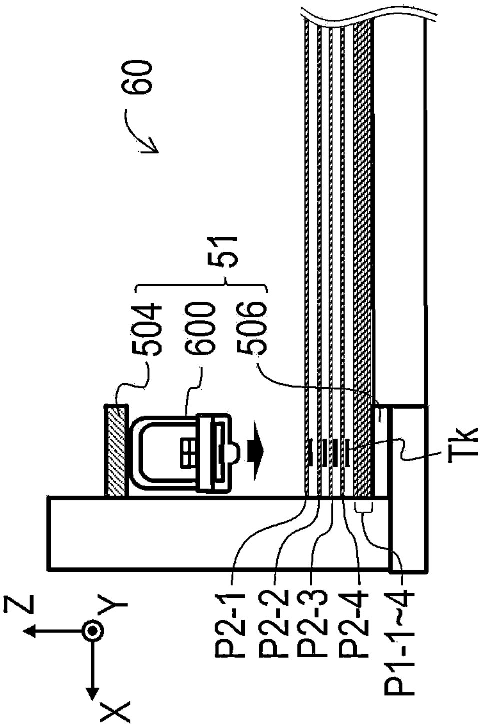
FIGS. 4A to 4C are each an explanatory view of the thermocompression operation of Example 1.
Figure 4A:
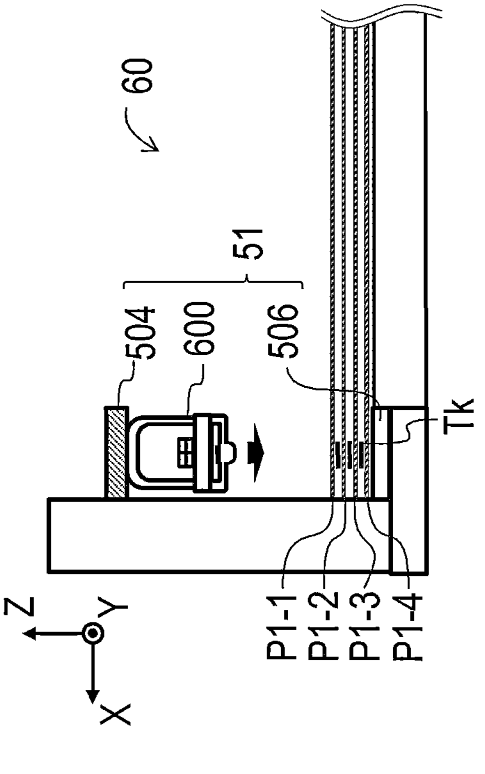
Figure 4C:
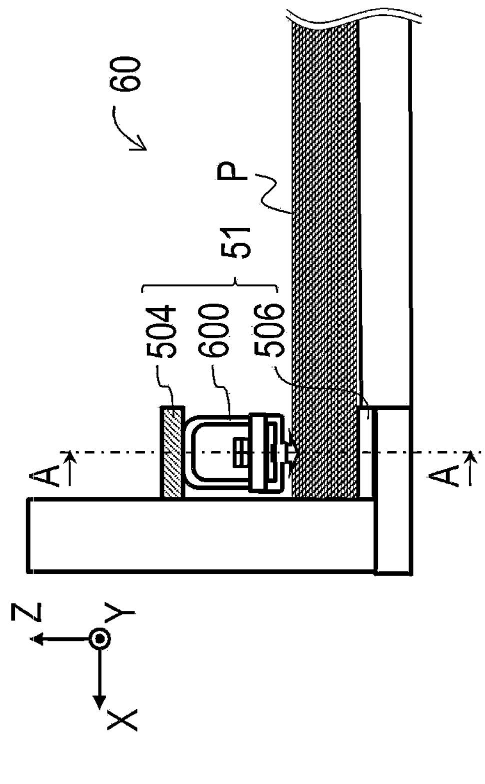

Next, a description will be given to the thermocompression operation of the sheet bundle by the thermocompression unit 51. FIGS. 4A to 4C are each an explanatory view of the thermocompression operation at the intermediate loading portion 42. FIG. 4A is a schematic cross sectional view of the thermocompression unit 51 showing the state in which four sheets P (P1-1, P1-2, P1-3, and P1-4) are loaded on the intermediate loading portion 42, and is subjected to thermocompression by the heating unit 600. FIG. 4B is a schematic cross sectional view of the thermocompression unit 51 showing the state in which 4 sheets P (P2-1, P2-2, P2-3, and P2-4) are further loaded on the intermediate loading portion 42 from the state of FIG. 4A, and is subjected to thermocompression by the heating unit 600. FIG. 4C is a schematic cross sectional view of the thermocompression unit 51 showing the state in which 20 sheets P are loaded on the intermediate loading portion 42, and is subjected to thermocompression by the heating unit 600.

The thermocompression unit 51 has a heating unit 600, a pressurizing lever 504 for pressurizing and moving the heating unit 600, and a pressurizing sheet 506 configuring a part of the sheet loading surface of the intermediate loading portion 42.

The pressurizing lever 504 is situated above the heating unit 600, acquires a power from a driving source not shown, and presses down the heating unit 600 toward the sheet P (the sheet loading surface of the intermediate loading portion 42) in the −Z direction (the downward direction in FIG. 4A).

The pressurizing sheet 506 is situated under the sheet bundle, is provided at a position overlapping the heating unit 600 in the loading direction of the sheets P, and sandwiches the sheet bundle with the heating sheet 602 of the heating unit 600. The pressurizing sheet 506 is made of silicon rubber with a thickness of 2.0 mm, and is a member for receiving the pressure with stability.

The sheets P loaded on the intermediate loading portion 42 form the sheet bundle while being aligned in the vertical direction (Y direction) and the transverse direction (X direction) by the foregoing alignment mechanism. At this step, the sheets P are aligned so that the adhesion toner Tk of a black toner configuring the adhesion layer on the sheet P may overlap the heating unit 600 and the pressurizing sheet 506 in the loading direction of the sheets P (Z direction).

At the thermocompression operation, the pressurizing lever 504 comes in contact with the metal stay 605 arranged above the heating unit 600, and presses the heating unit 600. Then, the heating unit 600 pressed down by the pressurizing lever 504 comes in contact with the sheet P situated at the top of the sheets P loaded at the intermediate loading portion 42, and applies the sheet bundle including four sheets P with a pressure. Namely, the pressure of the pressurizing lever 504 is transferred to the sheet bundle via the heating unit 600.

In Example 1, an A4-sized sheet bundle is applied with a pressure of a total pressure of 30 kgf (0.4 MPa in average surface pressure), so that the sheet bundle is pressurized uniformly to the longitudinal position in the Y direction. In the thermocompression operation, the heating unit 600 pressurizes the sheet bundle for 2 seconds, and then is separated away therefrom. The thermocompression operation is performed with the heating sheet 602 being heated by the ceramic heater 601. The sheet bundle is sandwiched and pressurized by the pressurizing portion 602*c* of the heating sheet 602 and the pressurizing sheet 506.

In Example 1, the sheets P are fed four by four to the intermediate loading portion 42. Each time, the thermocompression operation is executed. Specifically, as shown in FIG. 4A, the four sheets P (P1-1 to P1-4) are aligned, and loaded, then, the sheet bundle is heated and pressurized by the thermocompression unit 51. Then, the adhesion toner Tk is molten, and the four sheets P are bonded to one another. Subsequently, as shown in FIG. 4B, new four sheets P (P2-1 to P2-4) on the sheet bundle which has undergone the thermocompression operation are loaded, and the thermocompression operation is executed. At this step, the sheet P2-4 situated at the bottom of the newly loaded sheets P is bonded with the sheet P1-1 situated at the top of the originally loaded sheets P. Namely, at the thermocompression operation shown in FIG. 4B, not only the sheets P2-1 to P2-4 are bonded to one another, but also the bundle of the sheets P1-1 to P1-4 and the bundle of the sheets P2-1 to P2-4 are bonded to each other.

Thus, the booklet manufacturing apparatus 50 functions as a sheet thermocompression apparatus for bonding a plurality of sheets P to one another by the thermocompression unit 51. With the configuration of Example 1, loading of the sheets P and the thermocompression operation are repeatedly executed. For this reason, it is possible to manufacture a booklet including a large number of sheets (product). In Example 1, the booklet manufacturing apparatus 50 is configured so as to enable manufacturing of a booklet including a maximum of 50 sheets. When the thermocompression operation is consecutively executed, feeding of the sheets P to the intermediate loading portion 42, the descending operation of the heating unit 600, the pressurizing operation of the thermocompression unit 51 (for 2 seconds), and the ascending operation of the heating unit 600 are repeatedly executed, thereby performing effective booklet manufacturing.

After completion of the adhesion treatment by the thermocompression unit 51, a bundle paper discharge guide not shown moves in parallel in the direction of the sheet outlet 45 from the standby position, and pushes out the sheet bundle. The sheet outlet 45 is provided with a bundle paper output roller pair 38 as shown in FIG. 1.

At the position at which the tip of the sheet bundle is beyond the bundle paper output roller pair 38, the bundle paper discharge guide stops, and returns to the standby position again. At this step, the sheet bundle is sandwiched by the bundle paper output roller pair 38. The bundle paper output roller pair 38 discharges the sheet bundle received from the bundle paper discharge guide to the paper output lower tray 37. By the operations up to this point, the booklet manufacturing apparatus 50 of the post treatment apparatus 300 performs the adhesion treatment of the plurality of sheets P, resulting in the completion of a booklet including the plurality of sheets P bonded to one another.

Temperature Raising Detection Configuration

Figure 5:
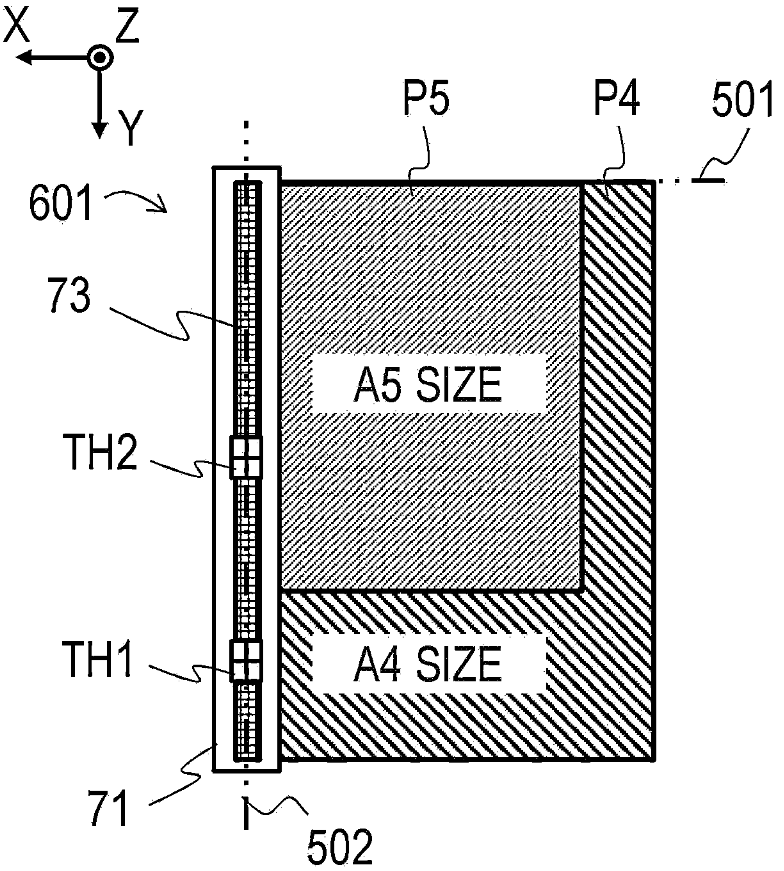
FIG. 5 is a view showing the positional relationship between a ceramic heater and a thermistor of Example 1.

Next, a description will be given to the temperature raising detection configuration of the heating unit 600. FIG. 5 is a schematic top view showing the positional relationship between the ceramic heater 601, and the thermistors TH1 and TH2 provided at the heating unit 600. FIG. 5 shows an A4-sized A4 sheet P4 and an A5-sized A5 sheet P5 with the vertical position aligned by the vertical adjustment reference position 501, and with the transverse position aligned by the transverse adjustment reference position 502.

As described above, the heating unit 600 is provided with the thermistor TH1 of a first temperature measuring sensor, and the thermistor TH2 of a second temperature measuring sensor. The thermistor TH1 is situated outside the A5 sheet P5 and inside the A4 sheet P4 in the longitudinal direction (Y direction). Specifically, the thermistor TH1 is arranged at a position of 254 mm from the vertical adjustment reference position 501. The thermistor TH1 is situated inside the A5 sheet P5 and inside the A4 sheet P4 in the vertical direction (Y direction). Specifically, the thermistor TH2 is arranged at the central portion of the long side of the A4 sheet P4, and at a position of 149 mm from the vertical adjustment reference position 501. Namely, the thermistor TH1 is arranged at a position more distant from the vertical adjustment reference position 501, and at a position closer to the vertical end of the A5 sheet P5 (the end opposite to the end to be made in alignment with the vertical adjustment reference position 501) as compared with the thermistor TH2.

The vertical length of the heat generator 73 of the ceramic heater 601 is the length corresponding to the long side of the A4 sheet P4. The heat generator 73 is temperature controlled by an electric power applying means so that the target temperature of the ceramic heater 601 (the detection temperature of the thermistor TH2) may become the set temperature (220 °C in Example 1). Thus, the thermistor TH2 is a temperature measuring sensor provided for temperature control of the ceramic heater 601 at the thermocompression operation as the main purpose. On the other hand, the thermistor TH1 is a temperature measuring sensor provided for detection of the heater temperature raising at the time of manufacturing a small-sized booklet as the main purpose. In Example 1, when an increase in heater temperature equal to or larger than a threshold value is detected by the thermistor TH1, the image formation interval is extended to suppress the heater temperature raising, so that the temperature of the ceramic heater 601 is controlled to a prescribed value or lower.

Figure 6A:
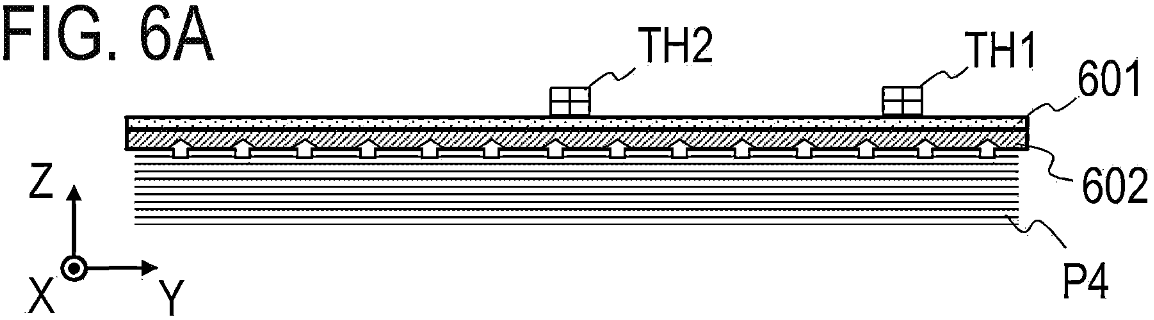
FIGS. 6A to 6C are each an explanatory view showing the load to be imposed on a heating sheet at the time of the thermocompression operation of Example 1.
Figure 6B:
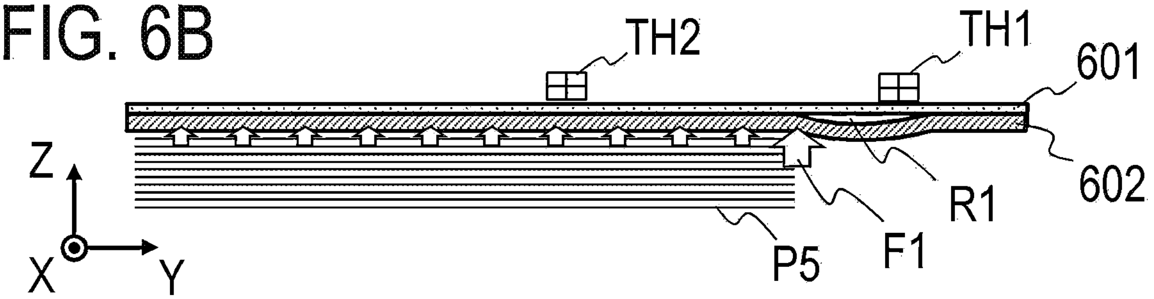
Figure 6C:
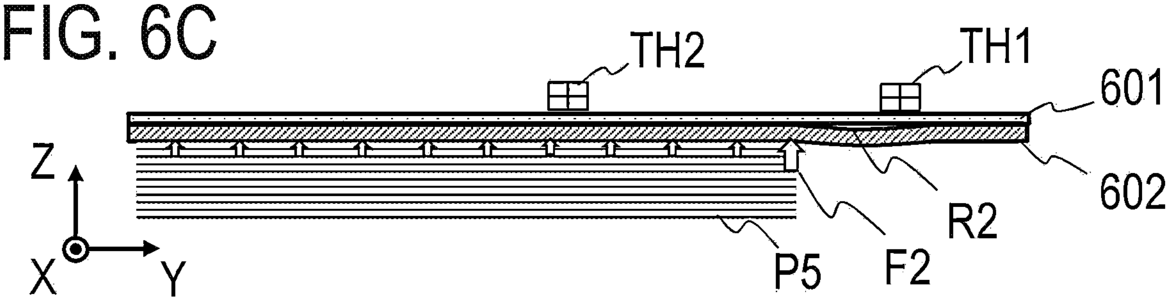

A description will be given to heater temperature raising at the time of manufacturing a small-sized booklet. FIG. 6A to 6C are each an explanatory view showing the load to be imposed on the heating sheet 602 at the time of the thermocompression operation. FIG. 6A is an A-A cross sectional view of FIG. 4C showing the state in which the thermocompression operation has been executed with 20 A4 sheets P4 loaded. FIG. 6B is an A-A cross sectional view of FIG. 4C showing the state in which the thermocompression operation has been executed with 20 A5 sheets P5 loaded. FIG. 6C is an A-A cross sectional view of FIG. 4C showing the state in which the thermocompression operation has been executed under a smaller pressure as compared with the state shown in FIG. 6B with 20 A5 sheets P5 loaded. In FIGS. 6A to 6C, for simplification, only the ceramic heater 601, the heating sheet 602, the thermistors TH1 and TH2, and the sheets P are shown, and a stress to be applied to the heating sheet 602 from the sheets P is indicated with an open arrow. In FIG. 6A to 6C, the size of the open arrow indicates the stress level.

For the thermocompression unit 51 and the heating unit 600 of Example 1, the longitudinal dimension set according to the A4 sheet P4 of the maximum sheet size that the booklet manufacturing apparatus 50 can support is determined. More specifically, as shown in FIG. 6A, the thermocompression unit 51 is configured so that the A4 sheet P4 may be evenly pressurized in the vertical direction (Y direction) by the heating sheet 602. At this step, the heating sheet 602 comes in contact with the sheet P over almost the entire region in the longitudinal direction. Therefore, at the time of the thermocompression operation, ununiform deformation is scarcely caused at the heating sheet 602, so that favorable adhesiveness between the ceramic heater 601 and the heating sheet 602 is kept.

On the other hand, at the thermocompression operation of the A5 sheet P5 with a shorter length in the vertical direction (in the longitudinal direction) than that of the A4 sheet P4, there occurs a non-pressurizing region not to come in contact with the A5 sheet P5, and not to pressurize the sheet bundle at the longitudinal end of the heating sheet 602 as shown in FIG. 6B. At this step, a strong stress concentration F1 acts on the heating sheet 602 at the boundary portion (the longitudinal end of the sheet bundle) between the pressurizing region where the heating sheet 602 pressurizes the A5 sheet P5 and the non-pressurizing region. With the configuration of Example 1, the stress concentration F1 is about 2.0 MPa.

As described above, when the stress concentration F1 occurs, so that a strong stress locally acts on the heating sheet 602, the heating sheet 602 is elastically deformed. At this step, as shown in FIG. 6B, a gap R1 at which the adhesiveness between the ceramic heater 601 and the heating sheet 602 is slightly reduced is generated in the vicinity of the boundary portion of the non-pressurizing region, and at a position outside the sheet bundle.

At the gap R1 at which the adhesiveness between the ceramic heater 601 and the heating sheet 602 is reduced, heat transfer from the ceramic heater 601 to the heating sheet 602 is hindered. When the thermocompression operation is repeatedly performed in such a state, the temperature of the portion of the ceramic heater 601 corresponding to the gap R1 gradually increases. A booklet including 50 A5 sheets P was manufactured using the booklet manufacturing apparatus 50 configured in the same manner as in Example 1. As a result, the temperature of a part of the ceramic heater 601 exceeded 270 °C, resulting in an excessively temperature raised state.

Excessive temperature raising of the ceramic heater 601 may incur breakage of the ceramic heater 601, and peripheral members thereof, and hence is desirably suppressed. In order to suppress excessive temperature raising, for example, the reduction of the temperature of the ceramic heater 601 at the time of the thermocompression operation can be considered. Alternatively, it can be considered as follows. As shown in FIG. 6C, the pressure applied to the sheet by the heating unit 600 is reduced to reduce the elastic deformation amount of the heating sheet 602, resulting in the reduction of the gap amount of the gap R2. However, the countermeasures may lead to the reduction of the adhesion strength of the booklet including a plurality of sheets P bonded to one another in place of suppressing the excessive temperature raising of the ceramic heater 601.

Under such circumstances, in Example 1, the thermistor TH1 for detecting temperature raising at the gap R1 of the ceramic heater 601 is arranged. The thermistor TH1 is arranged in the vicinity of the gap R1, and at a position not overlapping the A5 sheet P5 in the Z direction. The control portion 80 executes the temperature raising suppression operation for suppressing excessive temperature raising of the ceramic heater 601 on the basis of the measurement results (detection temperature) of the thermistor TH1. More specifically, when the detection temperature of the thermistor TH1 becomes equal to or higher than a threshold value, the control portion 80 executes the temperature raising suppression operation for suppressing the temperature of the ceramic heater 601 at a prescribed value or lower.

Temperature Raising Suppression Operation

Figure 7:
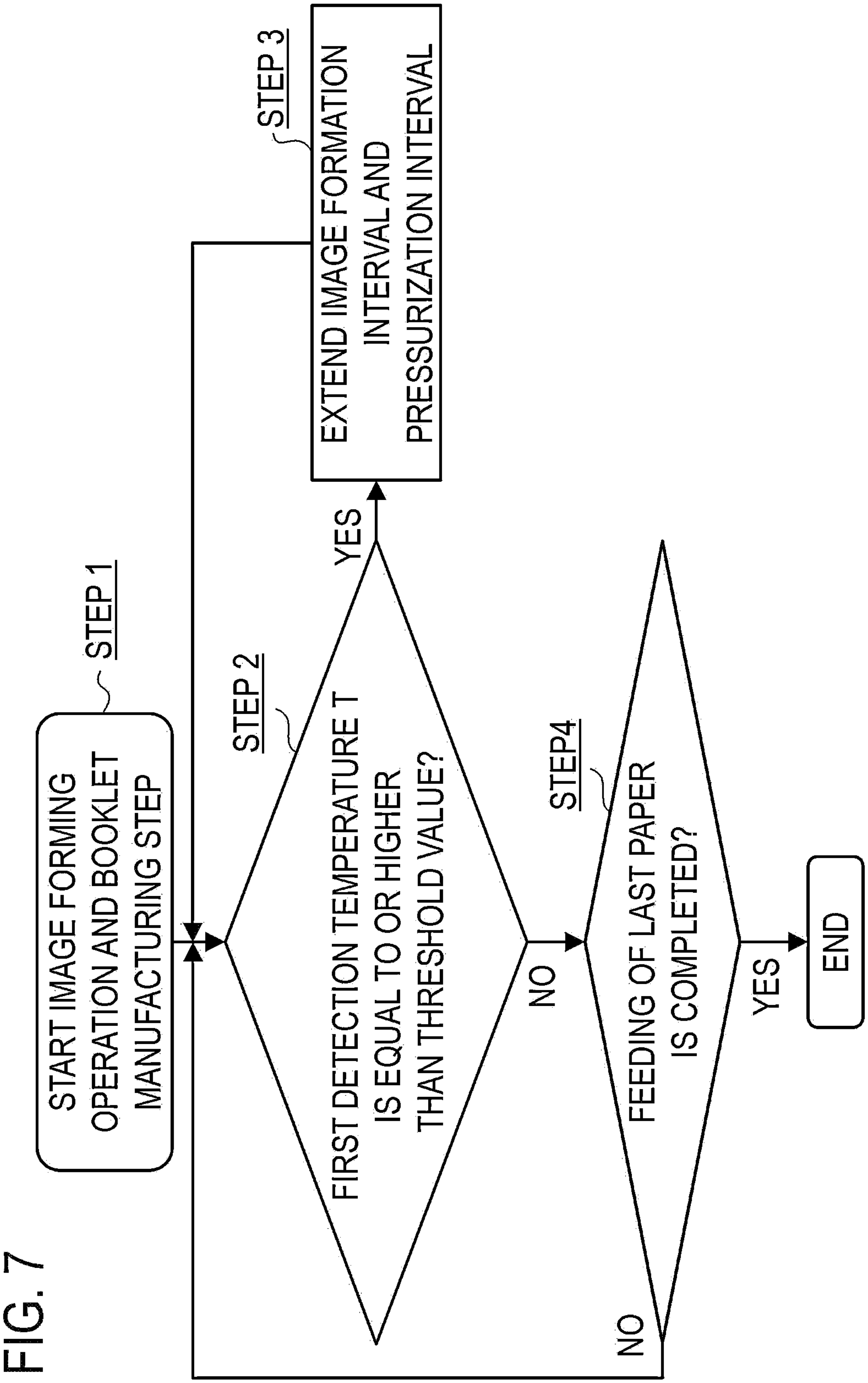
FIG. 7 is a flowchart of the temperature raising suppression operation of Example 1.

Next, a description will be given to the temperature raising suppression operation for suppressing temperature raising of the ceramic heater 601. FIG. 7 shows a flowchart of the temperature raising suppression operation at the image forming apparatus 100 and the post treatment apparatus 300 for manufacturing a booklet.

Step 1

First, as STEP 1, the image forming operation and the booklet manufacturing operation are started. The image forming operation and the booklet manufacturing operation are started by sending, from PC, etc., JOB (instruction) of booklet manufacturing with respect to the image forming apparatus 100 and the post treatment apparatus 300 in a ready state, respectively.

Step 2

Subsequently, as STEP 2, the control portion 80 determines whether the first detection temperature T1, i.e., the detection temperature of the thermistor TH1 of the thermocompression unit 51 provided at the post treatment apparatus 300 has exceeded a previously set prescribed threshold value, or not. The detection temperature determination step of the thermistor TH1 may be performed at an interval of a prescribed time, or for every image forming operation for one sheet.

Step 3

At the detection temperature determination step, when the first detection temperature T1 of the thermistor TH1 exceeded the threshold value, as STEP3, the feeding interval of the sheet P from the sheet cassette 8 by the paper feed roller 8*a* of the image forming apparatus 100 is extended. The extension instruction of the feeding interval may be such that the control portion 80 issues the instruction to the control portion of the image forming apparatus 100, or may be such that the control portion 80 is configured so as to be table to control the operation of the paper feed roller 8*a*.

When the feeding interval of the sheets P is extended at the image forming apparatus 100, the image formation interval of the image forming apparatus 100 and the pressurization interval of the sheet bundle by the thermocompression unit 51 of the booklet manufacturing apparatus 50 are extended. Thus, in Example 1, when the detection temperature of the thermistor TH1 is detected to be equal to or higher than a prescribed value, as the temperature raising suppression operation, an image formation interval extending step is executed. The relationship between the first detection temperature T1 and the image formation interval in Example 1 is shown in Table 1.

TABLE 1

| First detection temperature T1 | Image formation interval |
| --- | --- |
| Less than 250° C. | 2.0 seconds |
| 250° C. or more and less than 260° C. | 4.0 seconds |
| 260° C. or more and less than 270° C. | 10.0 seconds |
| 270° C. or more | Stop image formation until first detection temperature T1 becomes less than 250° C. |

When the first detection temperature T1 is less than 250 °C, the image formation interval is 2.0 seconds. When excessive temperature raising is not caused at the thermocompression operation, the image forming operation and the booklet manufacturing operation are repeatedly executed while the image formation interval still being 2.0 seconds. For example, when booklet manufacturing is performed with A4 sheets P4, the detection temperature of the thermistor TH1 is stable at about 220 °C, and the image formation interval is not extended.

On the other hand, when the first detection temperature T1 becomes 250 °C or more and less than 260 °C, the image formation interval is changed to 4.0 seconds. For example, when booklet manufacturing is repeatedly performed with A5 sheets P5, the ceramic heater 601 is raised in temperature in the vicinity of the gap R1 of the ceramic heater 601. Then, when the first detection temperature T1 of the thermistor TH1 becomes 250 °C or more and less than 260 °C, subsequent feeding interval of the sheets P is extended, and the image formation interval is changed to 4.0 seconds.

Similarly, when the first detection temperature T1 becomes 260 °C or more and less than 270 °C, the image formation interval is changed to 10.0 seconds. Further, when the first detection temperature T1 becomes 270 °C or more, the image forming operation is stopped, so that the image formation interval is extended. In this case, the image forming operation is continued until the first detection temperature T1 becomes less than 250 °C, and the temperature of the ceramic heater 601 is sufficiently reduced, and is stopped.

The operations of STEPS 2 to 3 are repeatedly executed until the completion of feeding of the last paper of the last sheet P to be subjected to the image forming operation and the booklet manufacturing operation. As STEP 4, when feeding of the last paper is completed, the image forming operation and the booklet manufacturing operation are terminated.

Figure 8A:
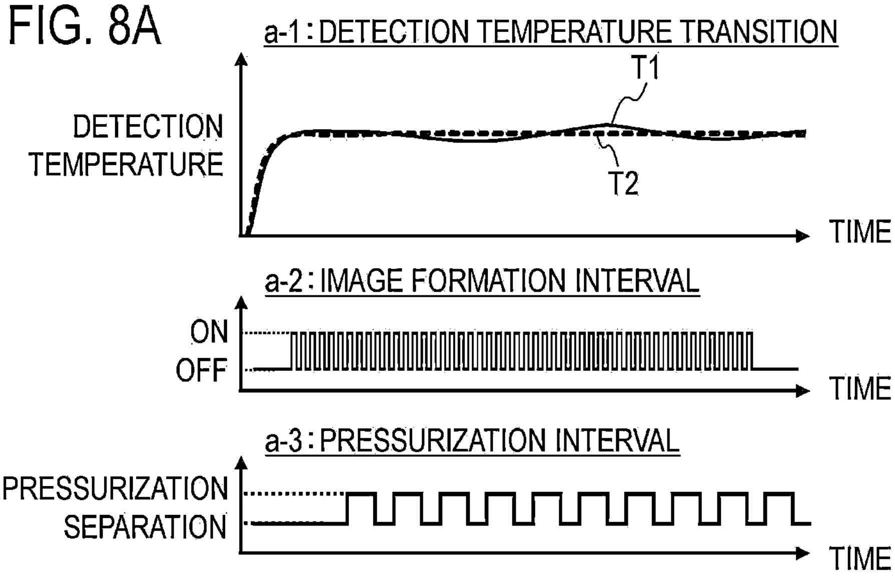
FIGS. 8A and 8B are each a view showing the detection temperature transition, the image formation interval, and the booklet manufacturing interval of Example 1.
Figure 8B:
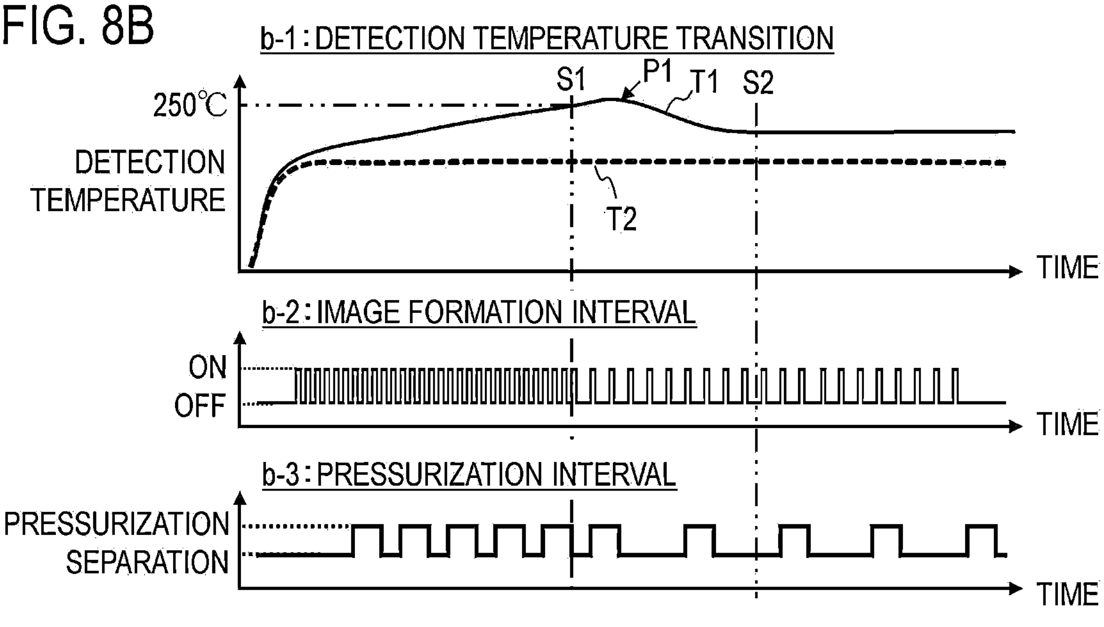

FIGS. 8A and 8B each show the transition of the first detection temperature T1 of the thermistor TH1 and the second detection temperature T2 of the thermistor TH2, the image formation interval by the image forming apparatus 100, and the pressurization interval by the thermocompression unit 51 of the booklet manufacturing apparatus 50 of the post treatment apparatus 300. FIG. 8A shows the transition of the detection temperature upon manufacturing a booklet of 50 A4 sheets P4, the image formation interval thereof, and the pressurization interval thereof. FIG. 8B shows the transition of the detection temperature upon manufacturing a booklet of 50 A5 sheets P5, the image formation interval thereof, and the pressurization interval thereof.

FIG. 8A shows a graph a-1 showing the transition of the first detection temperature T1 of the thermistor TH1 and the second detection temperature T2 of the thermistor TH2, a graph a-2 showing the image formation interval, and a graph a-3 showing the pressurization interval sequentially from the top. FIG. 8B also shows the same graphs b-1, b-2, and b-3 sequentially from the top.

Each vertical axis of the graphs a-1 and b-1 represents the detection temperature, and each horizontal axis represents the time. The graphs a-1 and b-1 each indicate the transition of the first detection temperature T1 with a solid line, and indicates the transition of the second detection temperature T2 with a dotted line.

The ON of each vertical axis of the graphs a-2 and b-2 represents the image formation state of the image forming apparatus 100, and the OFF represents the non-image formation state of the image forming apparatus 100, and the horizontal axis represents the time. The timing at which transition from OFF to ON is caused corresponds to the timing at which the paper feed roller 8*a* feeds a sheet P from the sheet cassette 8.

The pressurization of each vertical axis of the graphs a-3 and b-3 represents the pressurization state of the sheet bundle of the heating unit 600, and the separation represents the separation state of the heating unit 600 from the sheet bundle, and the horizontal axis represents the time.

First, a description will be given to each behavior at the time of booklet manufacturing with A4 sheets P4 with reference to FIG. 8A. As described above, at the time of booklet manufacturing with A4 sheets P4, excessive temperature raising of the ceramic heater 601 is not caused, and the first detection temperature T1 and the second detection temperature T2 change at constant temperatures with stability together. Therefore, the image forming operation and the booklet manufacturing operation are executed without extension of the feeding interval of the sheets P, and with the image formation interval and the pressurization interval still being constant.

Next, a description will be given to each behavior at the time of booklet manufacturing with A5 sheets P5 with reference to FIG. 8B. As described above, at the time of manufacturing a booklet with the A5 sheets P5, the gap R1 at which the stress concentration F1 elastically deforms the heating sheet 602, and the adhesiveness between the ceramic heater 601 and the heating sheet 602 is reduced is generated. As a result, the temperature of a part of the ceramic heater 601 gradually increases. The graph b-1 of FIG. 8B shows the state in which the first detection temperature T1 of the thermistor TH1 gradually increases.

When the first detection temperature T1 gradually increases, and exceeds 250 °C, the image formation interval is extended. As a result, the pressurization interval is also extended. In FIG. 8B, a timing Si at which the first detection temperature T1 has reached 250 °C is indicated with a dashed-and-double-dotted line. When the first detection temperature T1 exceeds 250 °C, as shown in the graph b-2, the image formation interval is immediately extended. As shown in the graph b-3, the pressurization interval is also extended.

After the timing Si at which the image formation interval has been extended, the first detection temperature T1 of the thermistor TH1 continues to increase for a short time. Then, upon an elapse of a certain time from extension of the image formation interval, the first detection temperature T1 reaches the peak P1, and then, gradually decreases. The pressurization interval is thus extended, so that the frequency of heat supply from the ceramic heater 601 via the heating sheet 602 to the sheet bundle is reduced. For this reason, even when the set temperature of the ceramic heater 601 is the same, the supplied electric energy is reduced, and the heater temperature raising is suppressed.

Then, after the first detection temperature T1 continues to decrease from the peak P1, the first detection temperature T1 changes by constant values with stability. Also subsequently, the image formation interval and the pressurization interval have been extended. For this reason, the thermocompression operation is executed with stability without generation of excessive temperature raising of the ceramic heater 601.

The heater temperature raising suppression control by the control portion 80 up to this point suppresses excessive temperature raising of the ceramic heater 601 in Example 1. Further, with the configuration of Example 1, it is possible to suppress the breakdown of the ceramic heater 601 and peripheral members thereof, and the quality deterioration of the booklet together.

Incidentally, the thermistor TH1 is preferably arranged at a position of within 50 mm from the longitudinal end of the A5 sheet P5 of the minimum-sized sheet in the longitudinal direction of the heating sheet 602. This is because arrangement of the temperature measuring sensor in the vicinity of the gap R1 at which excessive temperature raising tends to occur enables more proper monitoring of excessive temperature raising of the ceramic heater 601.

Configuration, Manufacturing Method, and Measurement Method of Toner Next, a description will be given to the configuration of the adhesion toner Tk including a thermoplastic resin for use in the present Example. The resin usable for the thermoplastic resin has no particular restriction, and a known thermoplastic resin can be used. Examples of the known thermoplastic resin may include polyester resin, vinyl type resin, acrylic type resin, styrene acrylic type resin, polyethylene, polypropylene, polyolefin, ethylene-vinyl acetate copolymer resin, and ethylene-acrylic acid copolymer resin. A plurality of the resins may be included therein.

The adhesion toner Tk preferably further includes a wax. As the waxes, known waxes such as ester waxes of esters of alcohol and an acid, and hydrocarbon wax such as paraffin wax can be used.

The adhesion toner Tk may include a colorant. As the colorants, known colorants such as a colorant for black, a colorant for yellow, a colorant for magenta, and a colorant for cyan can be used. The content of the colorant in the adhesion toner Tk is preferably 1.0 mass % or less, and more preferably 0.1 mass % or less. The adhesion toner Tk may include a magnetic body, a charge control agent, a wax, and an external additive.

In order to form an adhesion portion (adhesion layer) by the adhesion toner Tk on the sheet P using the electrophotographic system, the weight average particle diameter of the adhesion toner Tk is preferably at least 5.0 μm and not more than 30 μm, and more preferably at least 6.0 μm and not more than 20 μm. Further, any printing toner may be used as the adhesion toner Tk so long as it satisfies the adhesion.

Figure 9A:
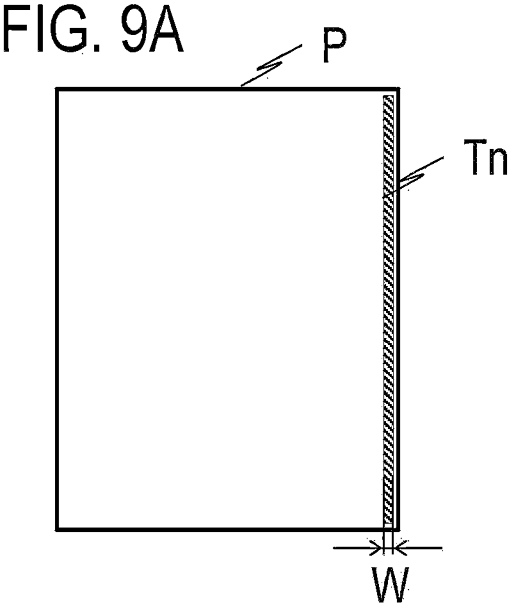
FIGS. 9A and 9B are each an explanatory view showing the print area of the adhesion toner of Example 1.
Figure 9B:
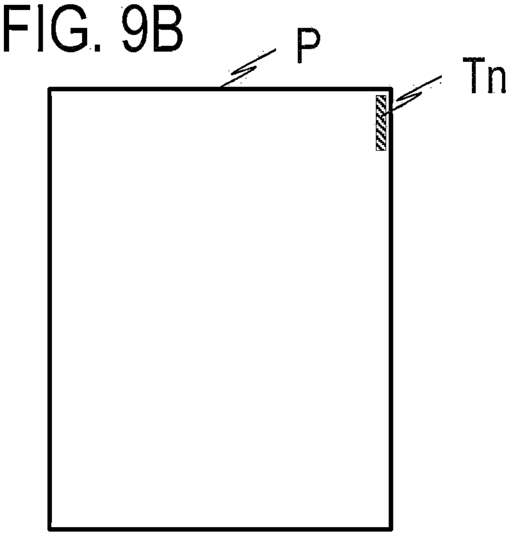

FIGS. 9A and 9B are each an explanatory view of the print area of the adhesion toner Tk. FIG. 9A is a schematic view showing the print area (shaded portion) of the adhesion toner Tk at the time of manufacturing a booklet with one long side bound. FIG. 9B is a schematic view showing the print area (shaded portion) of the adhesion toner Tk at the time of manufacturing a corner-bound booklet.

As shown in FIG. 9A, an image by the adhesion toner Tk is formed at the end of the long side of the sheet P. As a result, as a product at the time of manufacturing a booklet by the post treatment apparatus 300, a booklet with one long side bound is manufactured. Further, as in FIG. 9B, an image by the adhesion toner Tk is formed at one end of the long side of the sheet P. As a result, as the product, a corner-bound booklet is manufactured. In Example 1, the width W of the adhesion toner image was 4.0 mm, and the toner amount per unit area (application amount) of the adhesion toner Tk was set at 0.55 mg/cm$^2$. Incidentally, the toner amount was measured in an unfixed state after secondary transfer and before the fixing treatment.

A description will be given to the manufacturing example of the adhesion toner Tk.

Styrene 75.0 parts

N-butyl acrylate 25.0 parts

Polyester resin 4.0 parts (polyester resin with a weight-average molecular weight (MW) of 20000, a glass transition temperature (Tg) of 75 °C, and an acid value of 8.2 mgKOH/g)

Ethylene glycol distearate 14.0 parts (ester wax obtained by esterifying ethylene glycol and stearic acid)

Hydrocarbon wax (HNP-9, manufactured by NIPPON SEIRO Co., Ltd.)

2.0 parts

Divinylbenzene 0.5 part

A mixture obtained by mixing the materials was thermally insulated to 60 °C, and was stirred at 500 rpm using a T.K. homo-mixer (manufactured by PRIMIX Corporation), and was uniformly dissolved, thereby preparing a polymerizable monomer composition.

On the other hand, 850.0 parts of a 0.10 mol/L-$Na_3PO_4$ aqueous solution and 8.0 parts of a 10% hydrochloric acid were added in a container equipped with a high-speed stirring apparatus CLEARMIX (manufactured by M Technique Co., Ltd.), and the number of revolutions was adjusted to 15000 rpm, and heating was performed to 70 °C. Herein, a 1.0-mol/L-$CaCl_2$ aqueous solution was added in an amount of 127.5 parts, thereby preparing aqueous medium including a calcium phosphate compound.

After charging the polymerizable monomer composition into the aqueous medium, t-butyl peroxypivalate, i.e., a polymerization initiator was added in an amount of 7.0 parts. Thus, granulation was performed while keeping a number of revolutions of 15000 revolutions/min for 10 minutes. Subsequently, the stirrer was changed from the high-speed stirrer to a propeller stirring blade, and the reaction was effected under reflux at 70 °C for 5 hours. Then, the liquid temperature was set at 85 °C, and further the reaction was effected for 2 hours.

After completion of the polymerization reaction, the resulting slurry was cooled. Further, hydrochloric acid was added to the slurry, and the pH was set at 1.4. Thus, stirring was performed for 1 hour, thereby dissolving calcium phosphate salt. Thereafter, cleaning was performed with water in an amount 3 times that of the slurry, and after filtration and drying, classification was performed, resulting in an adhesion toner particle.

Subsequently, a silica fine particle (number-average particle diameter of primary particle: 10 nm, BET specific surface area: 170 m$^2$/g) subjected to a hydrophobic treatment using dimethyl silicone oil (20 mass %) was added as an external additive in an amount of 2.0 parts for every 100.0 parts of an adhesion toner particle. Then, using a MITSUI Henschel mixer (manufactured by CET CO., LTD.), mixing was performed at 3000 rpm for 15 minutes, resulting in an adhesion toner Tk.

The weight average particle diameter of the resulting adhesion toner Tk was 7.0 μm.

A manufacturing example of a printing toner will be described.

Styrene 60.0 parts

Colorant 6.5 parts (C. I. Pigment Blue 15:3, manufactured by Dainichiseika Color & Chemicals Mfg. Co., Ltd.)

The materials were charged into an attritor (manufactured by CET CO., LTD.), and further, using a zirconia particle with a diameter of 1.7 mm, dispersion was performed at 220 rpm for 5 hours, resulting in a pigment dispersion liquid.

Styrene 15.0 parts

N-butyl acrylate 25.0 parts

Polyester resin 4.0 parts (Polyester resin with a weight-average molecular weight (MW) of 20000, a glass transition temperature (Tg) of 75 °C, and an acid value of 8.2 mgKOH/g)

Behenyl behenate 12.0 parts (Ester wax obtained by esterifying behenic acid and behenyl alcohol)

Divinylbenzene 0.5 part

The materials were mixed, and was added to the pigment dispersion liquid. The resulting mixture was thermally insulated to 60 °C, was stirred at 500 rpm using a T. K. homo-mixer (manufactured by PRIMIX Corporation), and was uniformly dissolved, thereby preparing a polymerizable monomer composition.

On the other hand, 850.0 parts of a 0.10-mol/L-$Na_3PO_4$ aqueous solution and 8.0 parts of a 10% hydrochloric acid were added in a container equipped with a high-speed stirring apparatus CLEARMIX (manufactured by M Technique Co., Ltd.), and the number of revolutions was adjusted to 15000 rpm, and heating was performed to 70 °C. Herein, a 1.0-mol/L-$CaCl_2$ aqueous solution was added in an amount of 127.5 parts, thereby preparing aqueous medium including a calcium phosphate compound.

After charging the polymerizable monomer composition into the aqueous medium, t-butyl peroxypivalate, i.e., a polymerization initiator was added in an amount of 7.0 parts. Thus, granulation was performed while keeping a number of revolutions of 15000 revolutions/min for 10 minutes. Subsequently, the stirrer was changed from the high-speed stirrer to a propeller stirring blade, and the reaction was effected under reflux at 70 °C for 5 hours. Then, the liquid temperature was set at 85 °C, and further the reaction was effected for 2 hours.

After completion of the polymerization reaction, the resulting slurry was cooled. Further, hydrochloric acid was added to the slurry, thereby setting the pH at 1.4, and stirring was performed for 1 hour. As a result, a calcium phosphate salt was dissolved. Subsequently, cleaning was performed with water in an amount 3 times that of the slurry. After filtration and drying, classification was performed, resulting in a toner particle.

Subsequently, a silica fine particle (number-average particle diameter of primary particle: 10 nm, BET specific surface area: 170 $m^2/g$) subjected to a hydrophobic treatment using dimethyl silicone oil (20 mass %) was added as an external additive in an amount of 2.0 parts for every 100.0 parts of an adhesion toner particle. Then, using a MITSUI Henschel mixer (manufactured by CET CO., LTD.), mixing was performed at 3000 rpm for 15 minutes, resulting in an adhesion toner Tk.

The weight average particle diameter of the resulting toner was 7.0 μm.

A description will be given to the measurement method of the weight average particle diameter of the toner. The weight average particle diameters of the printing toner and the adhesion toner Tk are calculated in the following manner. As the measurement apparatus, there is used an accuracy particle size distribution measurement apparatus equipped with a 100-μm aperture tube "Coulter/counter Multisizer 3" (registered trademark trade name, manufactured by Beckman/Coulter Co.) by the pore electrical resistance method. For setting of the measurement conditions and analysis of the measurement data, included special-purpose software "Beckman/Coulter Multisizer 3 Version 3.51" (manufactured by Beckman/Coulter Co.) is used. Incidentally, the measurement is performed at an effective measurement channel number of 25000.

As the electrolytic aqueous solution for use in the measurement, the one obtained by dissolving special grade sodium chloride in ion exchanged water to a concentration of 1 mass %, such as "ISOTON II" (manufactured by Beckman/Coulter Co.) can be used.

Incidentally, before performing the measurement and the analysis, setting of special-purpose software is performed.

On the "Change Standard Measurement Method (SOM)" screen of the special-purpose software, the total count in the control mode is set to 50000 particles, the number of measurements is set at once, and the Kd value is set at the value obtained by using "standard particles 10.0 μm" (manufactured by Beckman/Coulter, Co.). By pressing the "Threshold/Noise Level Measurement Button", the threshold value and the noise level are automatically set. Further, the current is set to 1600 μA, the gain is set to 2, the electrolytic solution is set to ISOTON IL, and the "aperture tube flush after measurement" is checked.

In the "conversion setting of from pulse to particle size" screen of the special-purpose software, the bin interval is set to logarithmic particle size, the particle size bin is set to 256, and the particle size range is set to from 2 μm to 60 μm.

The specific measurement method is as follows.

Procedure 1

An electrolytic aqueous solution is placed in an amount of 200 mL in a 250-ml round bottom beaker made of glass exclusively for Multisizer 3, set on a sample stand, and the stirrer rod is stirred counterclockwise at 24 revolutions/second. Then, the dirt and bubbles in the aperture tube are removed by the "aperture tube flush" function of the special-purpose software.

Procedure 2

An electrolytic aqueous solution is placed in an amount of 30 mL in a 100-ml flat bottom beaker made of glass. Thereinto, a diluted solution obtained by diluting "Contaminone N" (a 10-mass % aqueous solution of a neutral detergent for pH-7 precision measuring instrument cleaning including a nonionic surfactant, an anionic surfactant, and, an organic builder, manufactured by Wako Pure Chemical Industries, Ltd.) with ion-exchanged water to 3 mass dilution is added in an amount of 0.3 mL.

Procedure 3

An ultrasonic disperser "Ultrasonic Dispersion System Tetora 150" (manufactured by Nikkaki Bios Co., Ltd.) including two oscillators having an oscillation frequency of 50 kHz with the phase shifted by 180 degrees, and having an electric output of 120 W is prepared. Ion exchanged water is placed in an amount of 3.3 L in a water tank of the ultrasonic disperser, and about 2 ml of the contamination N is added to the water tank.

Procedure 4

The beaker of the [Procedure 2] is set in the beaker fixing hole of the ultrasonic disperser, and the ultrasonic disperser is operated. Then, the height position of the beaker is adjusted so that the resonance state of the liquid surface of the electrolytic aqueous solution in the beaker may be maximized.

Procedure 5

With the electrolytic aqueous solution in the beaker of [Procedure 4] irradiated with an ultrasonic wave, a toner or the adhesion toner Tk is added to the electrolytic aqueous solution little by little and is dispersed so that the amount may become 10 mg. Then, the ultrasonic dispersion treatment is continued for another 60 seconds. Incidentally, for the ultrasonic dispersion, the water temperature of the water tank is appropriately adjusted so as to be at least 10 °C and not more than 40 °C.

Procedure 6

To the round bottom beaker of the [Procedure 1] set in the sample stand, the electrolytic aqueous solution in the [Procedure 5] including the toner or the adhesion toner Tk dispersed therein is added dropwise using a pipette, and the measurement concentration is adjusted to about 5%. Then, the measurement is performed until the number of measured particles may reach 50,000.

Procedure 7

The measurement data is analyzed with the special-purpose software attached to the apparatus, and the weight-average particle diameter is calculated.

A description will be given to the measurement method of the storage elastic modulus as the viscoelasticity characteristic of the toner. The storage elastic modulus of the adhesion toner Tk is measured using a dynamic viscoelasticity measurement apparatus (rheometer) ARES (manufactured by Rheometrics Scientific Co.). Measurement jig: a serrated type parallel plate with a diameter of 7.9 mm is used.

Measurement sample: using a pressure molding machine, 0.1 g of sample is molded into a cylindrical sample with a diameter of 8 mm, and a height of 2 mm (at normal temperatures, 15 kN is kept for 1 minute). For the pressure molding machine, a 100-kN press NT-100H manufactured by NPa System Co., is used.

The temperature of the serrated type parallel plate is regulated to 120 °C, and the cylindrical sample is heated and molten, thereby causing a serration to bite thereinto. A load is applied in the vertical direction so as to prevent the axial force from exceeding 30 (gf) (0.294 N), thereby fixing the sample to the serrated type parallel plate. At this step, a steel belt may be used so that the diameter of the sample may become equal to the diameter of the parallel plate. The serrated type parallel plate and the cylindrical sample are gradually cooled to the measurement start temperature of 30.00 °C over 1 hour.

Measurement frequency: 6.28 radian/sec

Setting of measurement distortion: the initial value is set at 0.1%, and measurement is performed in an automatic measurement mode.

Elongation correction of sample: adjusted in an automatic measurement mode.

Measurement temperature: temperature is raised from 30 °C to 140 °C at a rate of 2 °C per minute.

Measurement interval: viscoelasticity data is measured every 30 seconds, namely, every 1 °C.

Figure 10:
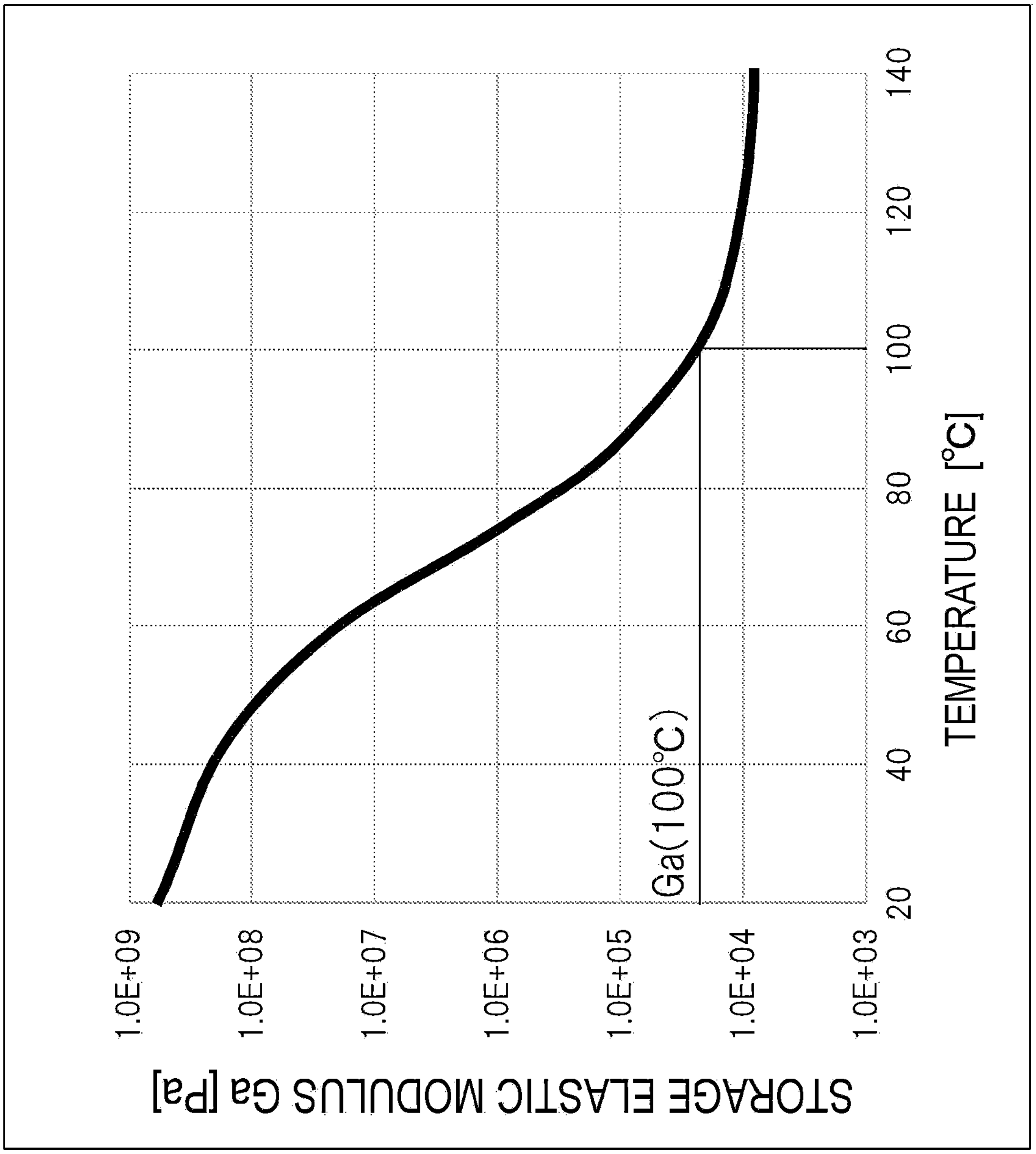
FIG. 10 is a graph showing the measurement results of the storage elastic modulus of the adhesion toner of Example 1.

FIG. 10 is a graph showing the measurement results of the storage elastic modulus of the adhesion toner Tk. As the representative value, a storage elastic modulus Ga (100 °C) at 100 °C and a storage elastic modulus Ga (80 °C) at 80 °C were obtained. Herein, Ga (100 °C)=2.2×104 Pa, Ga (80 °C)=3.2×105 Pa. Herein, at the time of fixing, the adhesion toner Tk on the sheet P had been raised in temperature to about 100 °C while passing through the fixing nip portion 6N of the fixing apparatus 6, and hence the storage elastic modulus Ga (100 °C) at 100 °C was acquired. Further, at the time of the adhesion treatment of the sheet bundle by the thermocompression unit 51, the storage elastic modulus Ga (80 °C) at the lowest toner temperature of 80 °C for bonding a maximum or 5 sheets was acquired. Particularly, as shown in FIG. 4A, the surface temperature of the heating sheet, and the set temperature of the temperature detection means were set so that the toner temperature between P1-3 and P1-4 for subjecting the P1-1 to P1-4 to an adhesion treatment at once may become 80 °C or more. Herein, the maximum basis weight of the sheet P in the present Example is 90 g/m$^2$.

Comparative Example

In order to verify the effects of Example 1, a comparative experiment of booklet manufacturing by Example 1 and Comparative Examples 1 to 3 was performed. In the present comparative experiment, as the experimental conditions, [a] sheet size, [b] total pressure, [c] set temperature, and [d] presence or absence of heater temperature raising suppression control were changed. Herein, the [b] total pressure is the total pressure to be applied to the sheet bundle loaded on the intermediate loading portion 42 by the heating unit 600. Further, the [c] set temperature is the control value of the second detection temperature T2 of the thermistor TH2, and is an indicator for the control portion 80 to control the heat generator 73. Further, as the experimental results (evaluation items), the [e] temperature raising result of the ceramic heater 601, and the [f] booklet adhesion strength were evaluated.

First, the experimental conditions of the comparative experiment will be described. The condition 1 is the configuration of Example 1, and the [a] sheet size is an A5 size, the [b] total pressure is 30 kgf, the [c] set temperature is 220 °C, and the [d] presence or absence of heater temperature raising suppression control is presence.

The condition 2 is Comparative Example 1 in which the [d] presence or absence of heater temperature raising suppression control has been changed to absence relative to the condition 1. The condition 3 is Comparative Example 2 in which the [c] set temperature has been reduced to 200 °C relative to the condition 1. The condition 4 is Comparative Example 3 in which the [b] total pressure has been reduced to 15 kgf relative to the condition 1. The condition 5 is Comparative Example 4 in which the [a] sheet size has been changed to an A4 size relative to the condition 2.

Next, the evaluation items of the comparative experiment will be described. The [e] temperature raising result of the ceramic heater 601 was evaluated using the peak P1 of the first detection temperature T1 detected by the thermistor TH1 in the process of manufacturing a booklet of 50 sheets P. Specifically, the case where the peak P1 has become 270 °C or more was referred to as NG, and the case of less than 270 °C was referred to as OK.

Figure 11A:
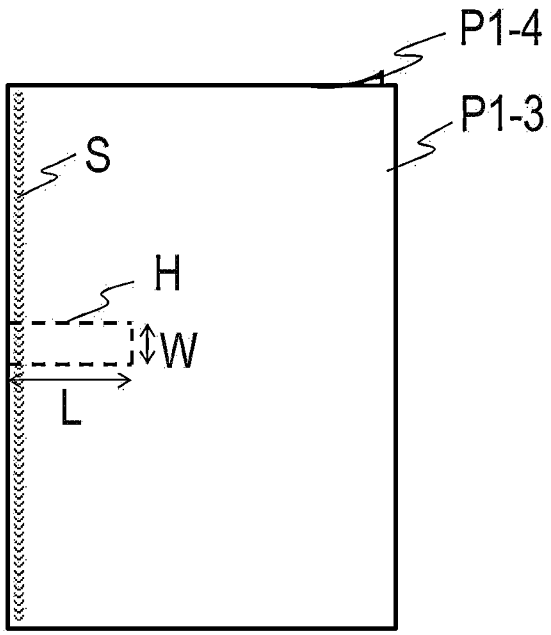
FIGS. 11A and 11B are each an explanatory view of the booklet quality testing method of Example 1.
Figure 11B:
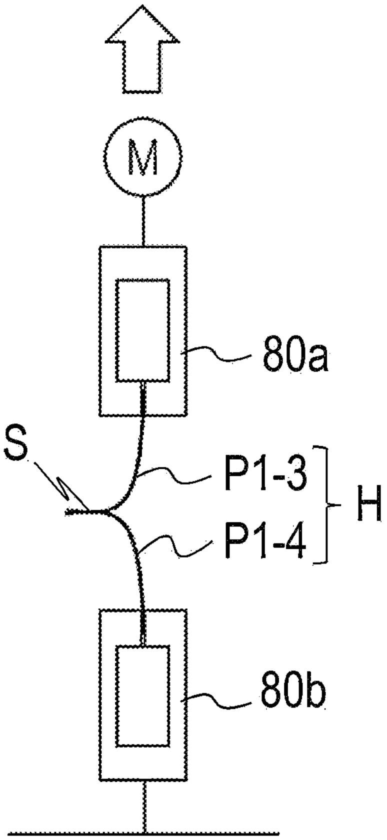

The booklet quality testing method for evaluating the [f] booklet adhesion strength in the comparative experiment will be described by reference to FIGS. 11A and 11B. FIGS. 11A and 11B are each an explanatory view of the booklet quality testing method.

First, a booklet including four sheets P as shown in FIG. 4A is manufactured by the image forming apparatus 100 and the thermocompression unit 51. At this step, the thermocompression unit 51 manufactures a booklet for testing the strength by one heating/pressurizing treatment.

Subsequently, of the sheets configuring the booklet, the sheets P1-1 and P1-2 are ripped off from the booklet, to be removed, resulting in a booklet of two sheets including only the sheets P1-3 and P1-4 bonded therein. Thereafter, as shown in FIG. 11A, a booklet including two sheets of the sheet P1-3 and the sheet P1-4 was cut out so as to have a width W of 20 mm, and a length L of 50 mm, thereby manufacturing a specimen H including an adhesion portion S formed of the adhesion toner Tn.

Subsequently, as shown in FIG. 11B, the booklet was held at a holding member 80*a* over on the sheet P1-3 side of the of the specimen H, and was held at a holding member 80*b* under on the sheet P1-4 side thereof. Further, the upper holding member 80*a* was connected with a Digital force gage M (manufactured by NIDEC SHIMPO CO. LTD., FGP-2). Subsequently, the Digital force gage M was gradually lifted upward, and the peel force at the time of peeling of the adhesion portion S was measured by the Digital force gage M, and the peak value of the peel force was recorded.

The measurement of the peel force was performed 5 times under each condition, and the average value was referred to as the booklet adhesion strength of the adhesion portion S. Incidentally, a close study by the present inventors has confirmed that the adhesion strength as the booklet is desirably 1.0 N/cm or more per unit distance in the width direction of the specimen H practically. Under such circumstances, in the present test, as the quality standard, 1.0 N/cm or more was determined as booklet strength OK, and the case of less than that is determined as booklet strength NG. Thus, the [f] booklet adhesion strength was evaluated. Herein, the reason why the adhesion strength between the sheet P1-3 and the sheet P1-4 was measured is as follows. The site therebetween is most distant from the heating sheet as compared with other bonding sites, and is the place that is less likely to be supplied with heat, and a site where the booklet adhesion strength may become a problem.

In this comparative experiment, as the sheet P, A4 size of GF-C081 manufactured by CANON Corp. was used. In the experiment in which the [a] sheet size was A5, the A4 size of the GF-C081 was cut in half for use, thereby eliminating the effects other than the sheet size, and performing a comparative experiment.

Next, the details of the experimental results of the experimental conditions will be described. The experimental conditions and the experimental results in the comparative experiment are shown in Table 2. In Table 2, the peak P1 of the first detection temperature T1 detected by the thermistor TH1 is shown in the column of the [e] temperature raising result of the ceramic heater 601, and the peak value of the peel force measured by the Digital force gage M is shown in the column of the [f] booklet adhesion strength.

Condition 1

In the condition 1 (Example 1), the peak P1 of the first detection temperature T1 was 258 °C, and did not exceed 270 °C. For this reason, the [e] temperature raising result of the ceramic heater 601 was OK. The [f] booklet adhesion strength was 1.1 N/cm, and was OK. Namely, in accordance with Example 1, it was confirmed that a favorable adhesive strength can be ensured while suppressing the excessive temperature raising of the ceramic heater 601.

Condition 2

In the condition 2 (Comparative Example 1), the peak P1 of the first detection temperature T1 was 275 °C, and exceeded 270 °C. For this reason, the [e] temperature raising result of the ceramic heater 601 was NG. The [f] booklet adhesion strength was 1.1 N/cm, and was OK. Namely, in Comparative Example 1 in which heater temperature raising suppression control was not executed, the excessive temperature raising of the ceramic heater 601 cannot be suppressed. When the booklet manufacturing operation is repeatedly executed under such experimental conditions, breakage of the ceramic heater 601 or deformation of the heater support 603 is caused, so that the booklet manufacturing apparatus 50 and the post treatment apparatus 300 may be broken down.

Condition 3

Under the condition 3 (Comparative Example 2), the peak P1 of the first detection temperature T1 was 240 °C, and did not exceed 270 °C. For this reason, the [e] temperature raising result of the ceramic heater 601 was OK. The [f] booklet adhesion strength was 0.7 N/cm, and was NG. In Comparative Example 2, the [c] set temperature was reduced to 200 °C relative to Example 1 and Comparative Example 1. For this reason, even when the heater temperature raising suppression control was not executed, the excessive temperature raising of the ceramic heater 601 was suppressed. On the other hand, the [c] set temperature was low, and hence the amount of heat to be applied to the sheet P was reduced, so that the booklet adhesion strength fell below 1.0 N/cm of the target value. Namely, in Comparative Example 2, a favorable adhesive strength cannot be ensured.

Condition 4

Under the condition 4 (Comparative Example 3), the peak P1 of the first detection temperature T1 was 248 °C, and did not exceed 270 °C. For this reason, the [e] temperature raising result of the ceramic heater 601 was OK. The [f] booklet adhesion strength was 0.5 N/cm, and was NG. In Comparative Example 3, the [b] total pressure was reduced

TABLE 2

| | [a] Sheet size | [b] Total pressure | [c] Set temperature | [d] Heater temperature raising suppression control | [e] Heater temperature raising result (P1) | [f] Booklet adhesion strength |
|---|---|---|---|---|---|---|
| (Condition 1) Example 1 | A5 | 30 kgf | 220° C. | Present | OK (258° C.) | OK (1.1 N/cm) |
| (Condition 2) Comparative Example 1 | A5 | 30 kgf | 220° C. | Absent | NG (275° C.) | OK (1.1 N/cm) |
| (Condition 3) Comparative Example 2 | A5 | 30 kgf | 200° C. | Absent | OK (240° C.) | NG (0.7 N/cm) |
| (Condition 4) Comparative Example 3 | A5 | 15 kgf | 220° C. | Absent | OK (248° C.) | NG (0.5 N/cm) |
| (Condition 5) Comparative Example 4 | A4 | 30 kgf | 220° C. | Absent | OK (220° C.) | OK (1.1 N/cm) |

to 15 kgf. For this reason, the stress concentration F2 at the boundary between the contact region and the non-contact region with respect to the A5 sheet P5 of the heating sheet 602 (see FIG. 6C) is weakened. Under the present condition, the stress concentration F2 is about 1.0 MPa. Then, the elastic deformation amount of the heating sheet 602 is reduced, so that the reduction of the adhesiveness between the ceramic heater 601 and the heating sheet 602 is suppressed. For this reason, the excessive temperature raising of the ceramic heater 601 is suppressed. On the other hand, the [b] total pressure was low, and hence the pressure to act on the sheet P was reduced. Accordingly, the booklet adhesion strength fell below 1.0 N/cm of the target value. Namely, in Comparative Example 3, a favorable adhesive strength cannot be ensured.

Condition 5

Under the condition 5 (Comparative Example 4), the peak P1 of the first detection temperature T1 was 220 °C, and did not exceed 270 °C. For this reason, the [e] temperature raising result of the ceramic heater 601 was OK. The [f] booklet adhesion strength was 1.1 N/cm, and was OK. Thus, with the configuration in which the adhesiveness between the ceramic heater 601 and the heating sheet 602 is less likely to be reduced because of the relationship between the heating sheet 602 and the sheet P, even when heater temperature raising suppression control is not executed, excessive temperature raising of the ceramic heater 601 is not caused, and a favorable adhesive strength is ensured.

As described above, in Example 1, the temperature measuring sensor is arranged at a position not overlapping the loading direction of the sheets P with respect to the minimum sheet of the minimum size that the booklet manufacturing apparatus 50 which is a sheet thermocompression apparatus can cope with. With such a configuration, at the time of the thermocompression operation of the sheet P with a smaller size than the maximum sheet such as the minimum sheet, the temperature measuring sensor detects the excessive temperature raising of the ceramic heater 601. Furthermore, with the configuration of Example 1, even when there is a large difference between the longitudinal width of the heating sheet 602 and the pressing width of the sheet P, and the adhesiveness between the ceramic heater 601 and the heating sheet 602 may be reduced, excessive temperature raising of the ceramic heater 601 can be suppressed while keeping a favorable adhesive strength. Namely, with a sheet thermocompression apparatus capable of coping with a plurality of sheet sizes, the quality deterioration of the booklet is suppressed, and the thermocompression operation can be executed with stability.

Further, in Example 1, the control portion 80 executes an excessive temperature raising suppression operation of controlling the heating value of the heat generator 73 on the basis of the measurement results of the thermistor TH2, and suppressing excessive temperature raising of the ceramic base material 71 of the ceramic heater 601 on the basis of the measurement results of the thermistor TH1. With such a configuration, the thermocompression operation can be executed with stability by suppressing excessive temperature raising of the ceramic heater 601 while keeping the temperature of the heating sheet 602 at a proper temperature.

Figure 12:
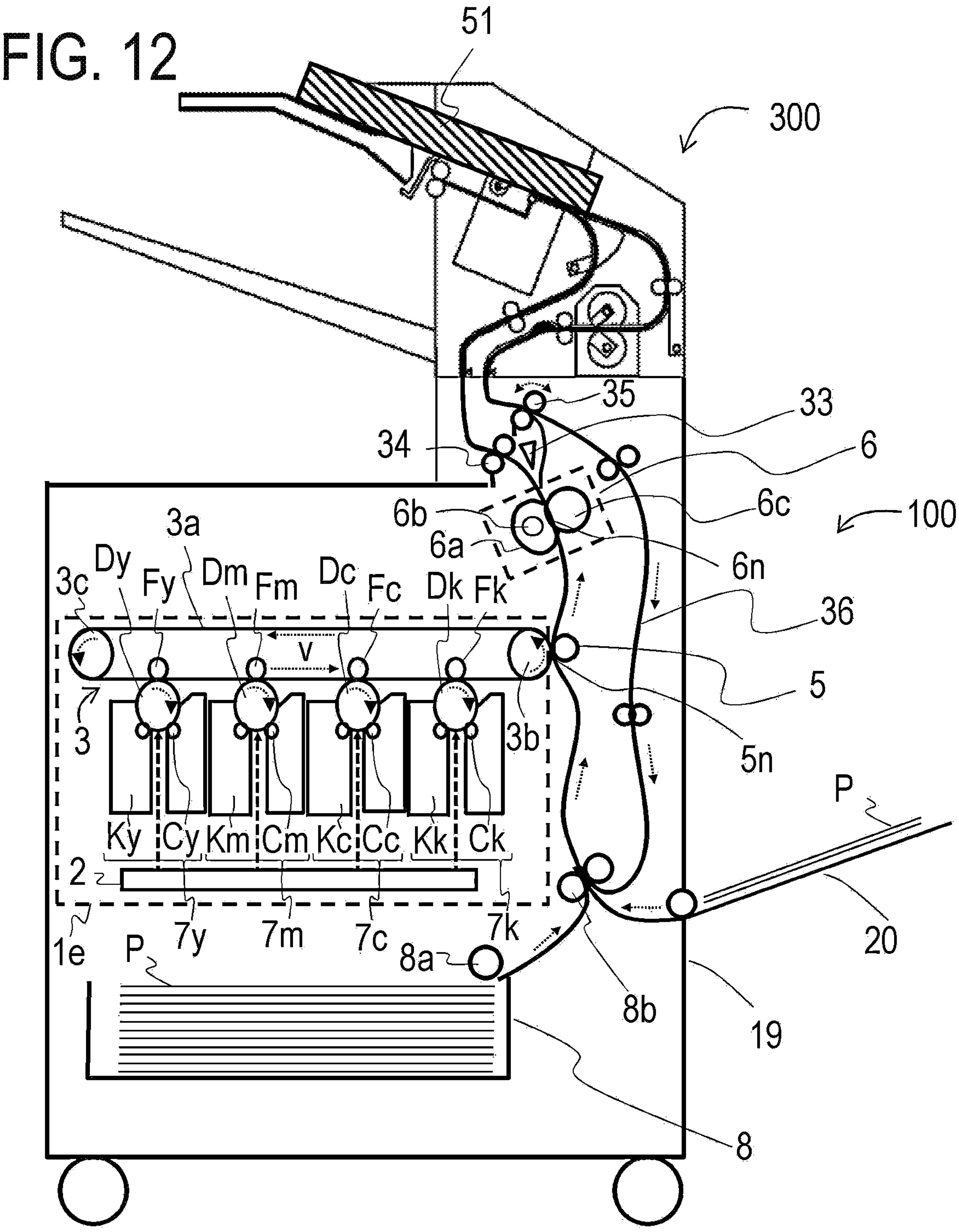
FIG. 12 is a schematic cross sectional view of a modified example image forming apparatus and post treatment apparatus of Example 1.

Incidentally, in Example 1, the post treatment apparatus 300 having the thermocompression unit 51 was arranged side by side with the image forming apparatus 100. However, the present invention is not applied only to such a configuration. For example, as in the modified example shown in FIG. 12, the configuration is also acceptable in which the post treatment apparatus 300 including the thermocompression unit 51 is arranged at the upper part of the main body of the image forming apparatus 100. FIG. 12 is a schematic cross sectional view showing a schematic configuration of the image forming apparatus 100 in accordance with the modified example of Example 1.

Further, with the configuration of Example 1, the thermistor TH1 for excessive temperature raising detection of the ceramic heater 601 was arranged at a position not overlapping the A5 sheet P5 of the minimum sheet in the loading direction. However, the present invention is not applied only to such a configuration. For example, a part of the thermistor TH1 may overlap the end of the A5 sheet P5 in the loading direction. Also with such a configuration, the thermistor TH1 arranged at a position more distant from the vertical adjustment reference position 501 and a position closer to the gap R1 than the thermistor TH2 can detect excessive temperature raising of the ceramic heater 601.

Further, with the configuration of Example 1, two temperature measuring sensors (thermistors) were provided. However, it may also be configured such that three or more temperature measuring sensors (thermistors) are provided. For example, of the sheets with prescribed sizes that the booklet manufacturing apparatus 50 can cope with, the sheets are referred to as a first sheet, a second sheet, and a third sheet in the order of decreasing size in the vertical direction. Then, a first temperature measuring sensor is arranged at a position overlapping the first sheet, and not overlapping the second sheet and the third sheet in the loading direction of the sheets. A second temperature measuring sensor is arranged at a position overlapping the first sheet and the second sheet, and not overlapping the third sheet, and a third temperature measuring sensor is arranged at a position overlapping all the sheets. As such a configuration, the following configuration is acceptable: at the time of the thermocompression operation of the second sheet, the first temperature measuring sensor detects excessive temperature raising of the ceramic heater 601, and at the time of the thermocompression operation of the third sheet, the second temperature measuring sensor detects excessive temperature raising of the ceramic heater 601.

Further, with the configuration of Example 1, when the thermistor TH1 detected that the ceramic heater 601 was raised in temperature to a prescribed temperature or higher, the interval of the image forming operation or the booklet manufacturing operation was extended as the temperature raising suppression operation. However, the present invention is not limited to such a configuration. For example, the following configuration is also acceptable. Without extending the image formation interval, the conveyance interval of the sheets P to be conveyed to the post treatment apparatus 300 or the like is extended, thereby extending the pressurization interval at the booklet manufacturing operation. Alternatively, it may be configured such that the pressurization interval is shortened the when the first detection temperature T1 decreased to a prescribed temperature value or lower after extending the pressurization interval at the booklet manufacturing operation. Still alternatively, the following configuration is also acceptable. When the first detection temperature T1 exceeds a threshold value, a user is informed of abnormal temperature raising by an alarm or the like, thereby leaving the decision of extension of the pressurization interval or stopping of the booklet manufacturing operation thereto. Further, in Example 1, the control portion 80 that acquired the first detection temperature T1 of the thermistor TH1 arranged outside the A5 sheet P5 in the longitudinal direction executed the temperature raising suppression operation. However, it may be configured such that a user or another apparatus monitors the first detection temperature T1, and determines the execution of the temperature raising suppression operation.

Example 2

Next, Example 2 in accordance with the present invention will be described. Below, a description will be given to only the different point of the configuration of Example 2 from the configuration of Example 1. In the configuration of Example 2, the same ones as those of the configuration of Example 1 of the image forming apparatus 100, the post treatment apparatus 300, and the like will be given the same reference numerals and signs, and a description thereon will be omitted. Example 2 is different from Example 1 in that a polyimide sheet 604 is provided between the ceramic heater 601 and the heating sheet 602.

Heating Unit

Figure 13:
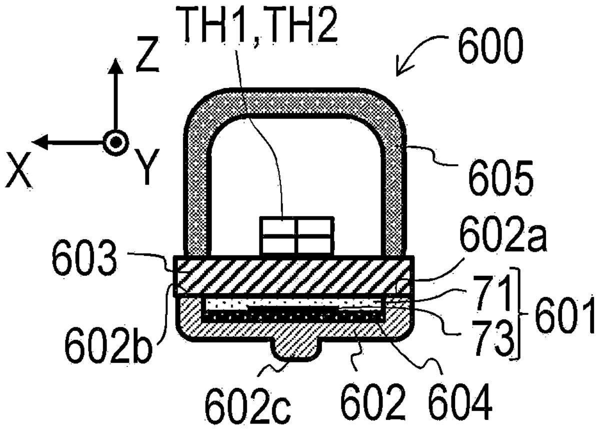
FIG. 13 is a schematic cross sectional view showing the configuration of a heating unit of Example 2.

The structure of a heating unit 600 in accordance with Example 2 will be described. FIG. 13 is an explanatory view showing the configuration of the heating unit 600 in accordance with Example 2, and is a schematic cross sectional view of the heating unit 600 as seen in the Y direction. As shown in FIG. 13, the heating unit 600 is provided with the polyimide sheet 604 as the intermediate member between the ceramic heater 601 and the heating sheet 602 in the loading direction of the sheets P.

The polyimide sheet 604 is a member for keeping good the heat transfer from the ceramic heater 601 to the heating sheet 602. The polyimide sheet 604 in accordance with Example 2 has a thickness of 20 μm, a width of 8.0 mm, and a length of 350 mm. The width and the length of the polyimide sheet 604 are the same dimensions as those of the ceramic heater 601, and the thickness is set thin so as to prevent the inhibition of the heat transfer from the ceramic heater 601 to the heating sheet 602. The thermal conductivity $\lambda h$ of the polyimide sheet 604 is 0.20 W/mK, and the Young's modulus is about 5.0 GPa.

Figure 14:
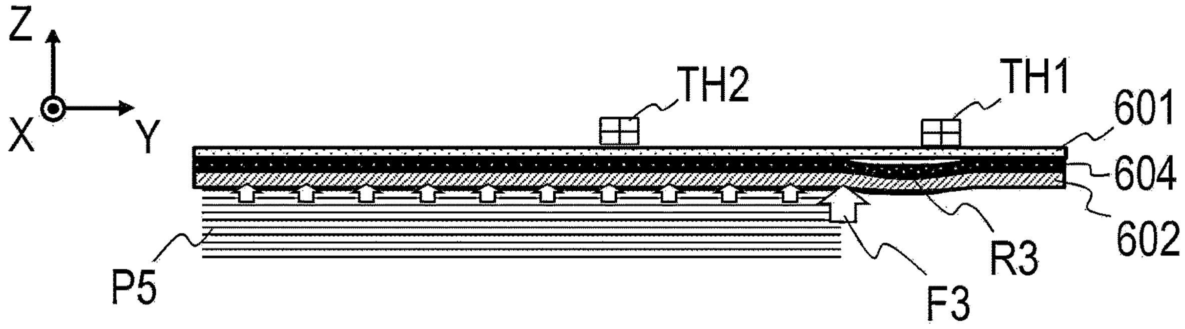
FIG. 14 is an explanatory view showing the load to be imposed on the heating sheet at the time of the thermocompression operation of Example 2.

FIG. 14 is an explanatory view showing the load to be applied to the heating sheet 602 in accordance with Example 2 at the time of the thermocompression operation, and is a schematic cross sectional view of the manner in which the thermocompression operation has been executed with 20 A5 sheets P5 loaded thereon as seen in the X direction. Also with the configuration of Example 2, stress concentration F3 acts on the boundary portion between the pressurizing region with respect to the A5 sheets P5 in the Y direction of the heating sheet 602 and the non-pressurizing region thereof, so that the heating sheet 602 is elastically deformed. Then, a gap R3 is generated where the adhesiveness between the ceramic heater 601 and the heating sheet 602 via the polyimide sheet 604 is reduced.

In Example 2, the polyimide sheet 604 is sandwiched between the ceramic heater 601 and the heating sheet 602. For this reason, the gap amount of the gap R3 is reduced. Therefore, the polyimide sheet 604 suppresses the inhibition of the heat transfer from the ceramic heater 601 to the heating sheet 602.

Figure 15:
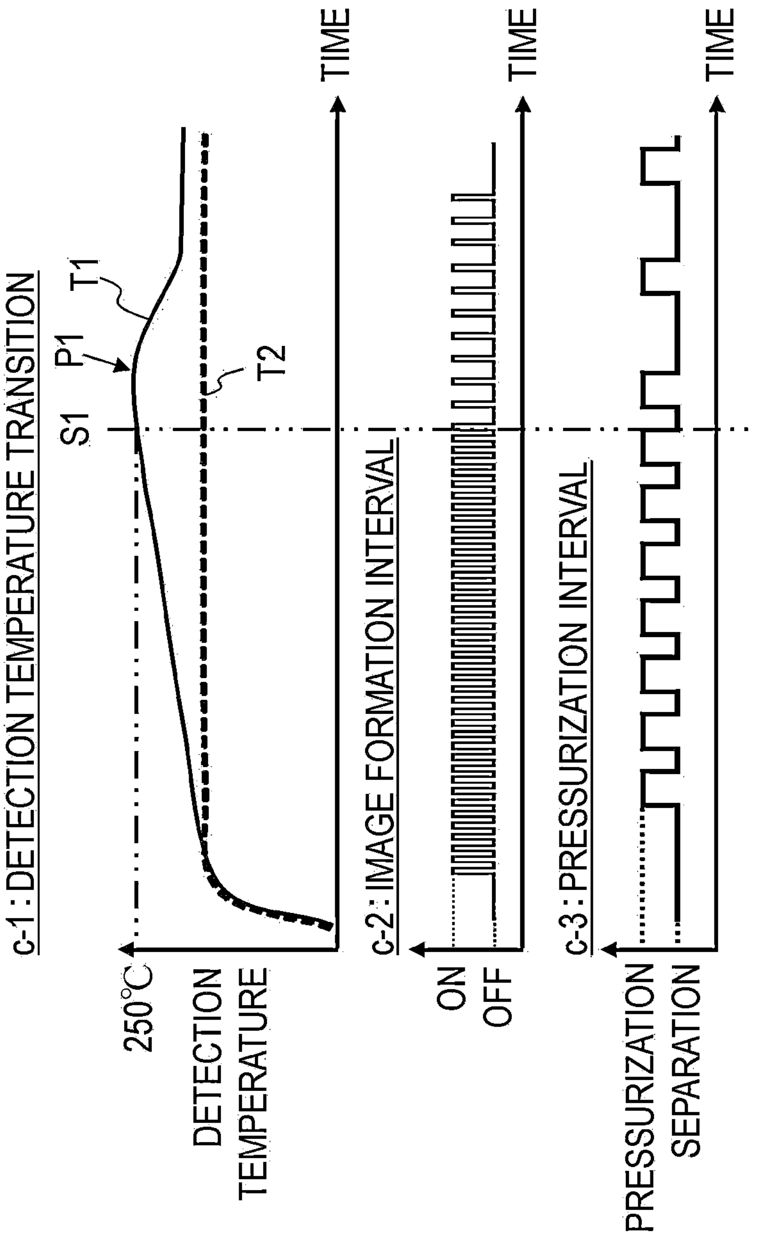
FIG. 15 is a view showing the detection temperature transition, the image formation interval, and the booklet manufacturing interval of Example 2.

FIG. 15 shows the transition of the first detection temperature T1 of the thermistor TH1 and the second detection temperature T2 of the thermistor TH2, the image formation interval by the image forming apparatus 100, and the pressurization interval by the thermocompression unit 51 of the booklet manufacturing apparatus 50 of the post treatment apparatus 300. FIG. 15 shows the transition of the detection temperature, the image formation interval, and the pressurization interval when the booklet manufacturing apparatus 50 in accordance with Example 2 has manufactured a booklet of 50 A5 sheets P5.

FIG. 15 shows a graph c-1 showing the transition of the first detection temperature T1 of the thermistor TH1 and the second detection temperature T2 of the thermistor TH2, a graph c-2 showing the image formation interval, and a graph c-3 showing the pressurization interval sequentially from the top. The vertical axis and the horizontal axis of each graph, and the like are the same as those of each graph in accordance with Example 1 shown in FIG. 8A.

With the configuration of Example 2, the control portion 80 controls the heat generator 73 so that the target temperature of the ceramic heater 601 at the time of the thermocompression operation may become 225 °C. The reason why the target temperature is set higher than 220 °C of Example 1 is that the polyimide sheet 604 has been newly provided. The amounts of heat to be applied to the sheet P are equivalent between Example 2 and Example 1. In other words, in Example 2, the amount of heat for the provision of the polyimide sheet 604 is compensated for by setting the target temperature of the ceramic heater 601 high.

As described above, at the time of manufacturing of a booklet with the A5 sheets P5, the stress concentration F3 elastically deforms the heating sheet 602, so that the gap R3 is generated where the adhesiveness between the ceramic heater 601 and the heating sheet 602 is reduced. Accordingly, the temperature of a part of the ceramic heater 601 gradually increases. The graph c-1 of FIG. 15 shows the manner in which the first detection temperature T1 of the thermistor TH1 gradually increases.

When the first detection temperature T1 gradually increases, and exceeds 250 °C, the image formation interval is extended. As a result, the pressurization interval is also extended. FIG. 15 shows the timing Si at which the first detection temperature T1 has reached 250 °C with a dashed-and-double-dotted line. When the first detection temperature T1 exceeds 250 °C, as shown in the graph c-2, the next image formation interval is immediately extended, and as shown in the graph c-3, the pressurization interval is also extended. On the other hand, after the timing Si at which the image formation interval has been extended, the first detection temperature T1 of the thermistor TH1 continues to increase for a short time. Then, upon an elapse of a certain degree of time from the extension of the image formation interval, the first detection temperature T1 reaches the peak P1, and thereafter, gradually decreases. Thus, the pressurization interval is extended, thereby reducing the frequency of heat supply from the ceramic heater 601 via the heating sheet 602 to the sheet bundle, so that heater temperature raising is suppressed. This point is the same as in Example 1.

On the other hand, with the configuration of Example 2, relative to Example 1, the increase in the first detection temperature T1 is gentler, and the timing at which Si is reached is slower. Specifically, with the configuration of Example 1, at the timing of the image forming operation of the 29-th A5 sheet P5, the first detection temperature T1 reached 250 °C. In contrast, with the configuration of Example 2, at the timing of the image forming operation of the 40-th A5 sheet P5, the first detection temperature T1 reached 250 °C. Therefore, in Example 2, as compared with Example 1, the image formation interval and the pressurization interval are extended at a later timing. For this reason, the time taken for manufacturing a booklet of 50 A5 sheets P5 was shortened, and the booklet manufacturing time was reduced by 12%.

Thus, in Example 2, the polyimide sheet 604 as the intermediate member suppresses the inhibition of heat transfer due to the reduction of the adhesiveness between the ceramic heater 601 and the heating sheet 602 generated at the time of pressurization of a small-sized sheet bundle. Namely, in Example 2, the polyimide sheet 604 functions as the gap filling member for reducing the gap generated between the ceramic heater 601 and the heating sheet 602, and the heat transfer member.

Comparative Experiment

Next, a comparative experiment in accordance with Example 2 will be described. The evaluation items of the comparative experiment are [e] temperature raising result of the ceramic heater 601 and [f] booklet adhesion strength as with the comparative experiment described in Example 1. Further, the test conditions of Example 2 of [a] sheet size, [b] total pressure, and [d] presence or absence of the heater temperature raising suppression control are also the same as those of Example 1. The experimental conditions and the experimental results in Example 2 are shown as conditions 6 in Table 3. Incidentally, Table 3 shows the experimental conditions and the experimental results of Example 1 together for reference.

TABLE 3

| | [a] Sheet size | [b] Total pressure | [c] Set temperature | [d] Heater temperature raising suppression control | [e] Heater temperature raising result (P1) | [f] Booklet adhesion strength |
|---|---|---|---|---|---|---|
| (Condition 1) Example 1 | A5 | 30 kgf | 220° C. | Present | OK (258° C.) | OK (1.1 N/cm) |
| (Condition 6) Example 2 | A5 | 30 kgf | 225° C. | Present | OK (252° C.) | OK (1.1 N/cm) |

In Example 2, the peak P1 of the first detection temperature T1 was 252 °C, and did not exceed 270 °C. For this reason, the [e] temperature raising result of the ceramic heater 601 was OK. The [f] booklet adhesion strength was 1.1 N/cm, and was OK. Namely, in accordance with Example 2, it has been confirmed that a favorable adhesive strength can be ensured while suppressing excessive temperature raising of the ceramic heater 601.

Further, as compared with Example 1, although the [c] set temperature of the ceramic heater 601 of Example 2 was higher, the peak P1 of the first detection temperature T1 was lower. Thus, a heat transfer member for reducing the gap such as the polyimide sheet 604 is interposed between the ceramic heater 601 and the heating sheet 602. This can shorten the booklet manufacturing time while effectively suppressing the heater excessive temperature raising.

Incidentally, with the configuration of Example 2, the polyimide sheet 604 was used as the intermediate member between the ceramic heater 601 and the heating sheet 602. However, the present invention is not limited to such a configuration. The intermediate member is exposed to high temperatures. For this reason, preferable is the one having a heat resistance, and having lower rigidity than that of the ceramic heater 601 or the heating sheet 602 in order to improve the adhesiveness between the ceramic heater 601 and the heating sheet 602. The rigidity G of the intermediate member is determined by the product of the Young's modulus E thereof and the cross sectional area J thereof (G=E×D). For this reason, as the intermediate member, preferable is the one having "a low Young's modulus E", or having "a small cross sectional area J". As the intermediate member, for example, other than a polyimide sheet, a resin sheet material, a metal sheet material, or a heat-resistant grease having a heat resistance, and being a thin film may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-114879, filed on Jul. 13, 2023, which is hereby incorporated by reference herein in its entirety.

What is claimed is:

1. A sheet thermocompression apparatus for bonding a plurality of sheets to one another, and configured to be compatible with the sheets with a plurality of prescribed sizes, the sheet thermocompression apparatus comprising:

a loading portion to be loaded with the bundle of sheets each including the adhesion layer formed thereon; and a thermocompression unit including (i) a metallic heating sheet pressing the bundle of sheets loaded on the loading portion in a loading direction of the sheets, a longitudinal direction of the thermocompression unit being a direction along one edge of the sheets loaded on the loading portion and a short direction of the thermocompression unit being orthogonal to the longitudinal direction and the loading direction, (ii) a heating source heating the metallic heating sheet, (iii) a stay including a first leg and a second leg that apply pressure to the metallic heating sheet at two pressure-applying portions, respectively, each of the first leg and the second leg extending along the longitudinal direction so as to apply pressure to the metallic heating sheet along the longitudinal direction, and (iv) a temperature measuring sensor arranged at a position not overlapping a minimum sheet with a minimum size of the prescribed sizes loaded on the loading portion in the loading direction, and configured to detect a temperature of the heating source, wherein the heating source is disposed, in the short direction, between the two pressure-applying portions at which the metallic heating sheet receives the pressure from the first leg and the second leg, respectively, and the heating source does not receive the pressure via the stay, and wherein, when a small-size sheet bundle having a size smaller than a maximum size among the prescribed sizes is pressurized by the metallic heating sheet, a non-contact region in which the metallic heating sheet does not contact the small-size sheet bundle is generated in the longitudinal direction.

2. The sheet thermocompression apparatus according to claim 1, further comprising:

a control portion executing a temperature raising suppression operation of suppressing temperature raising of the heating source on the basis of a measurement result of the temperature measuring sensor.

3. The sheet thermocompression apparatus according to claim 1, wherein the metallic heating sheet overlaps from one end to an other end in the longitudinal direction of a maximum sheet loaded on the loading portion in the loading direction, in a case where the maximum sheet represents the sheet with a maximum size of the prescribed sizes.

4. The sheet thermocompression apparatus according to claim 1, wherein the temperature measuring sensor is arranged at a position of within 50 mm from an end, which is in the longitudinal direction, of the minimum sheet loaded on the loading portion in the longitudinal direction.

5. The sheet thermocompression apparatus according to claim 1, wherein in a case where the temperature measuring sensor is a first temperature measuring sensor, the thermocompression unit includes a second temperature measuring sensor arranged at a position overlapping the minimum sheet loaded on the loading portion in the loading direction, and wherein the control portion controls electrical power supplied to the heating source so that a temperature detected by the second temperature measuring sensor is maintained at a target temperature.

6. The sheet thermocompression apparatus according to claim 1, wherein the heating source includes a substrate which is long in the longitudinal direction, and a heat generator provided at the substrate.

7. The sheet thermocompression apparatus according to claim 6, wherein a thermal conductivity of the metallic heating sheet is equal to or larger than a thermal conductivity of the substrate.

8. The sheet thermocompression apparatus according to claim 6, wherein the substrate is a ceramic base material.

9. The sheet thermocompression apparatus according to claim 1, wherein the thermocompression unit has an intermediate member sandwiched between the metallic heating sheet and the heating source in the loading direction, and having lower rigidity than those of the metallic heating sheet and the heating source.

10. The sheet thermocompression apparatus according to claim 2, wherein the control portion extends, as the temperature raising suppression operation, an interval of a pressurization operation by the metallic heating sheet of the sheets loaded on the loading portion when a measurement result of the temperature measuring sensor exceeds a prescribed threshold value.

11. The sheet thermocompression apparatus according to claim 1, wherein the loading portion has an adjustment mechanism for adjusting a position in a vertical direction along the longitudinal direction of the sheets loaded on the loading portion, and a position in a transverse direction orthogonal to the vertical direction.

12. A sheet thermocompression apparatus for bonding a plurality of sheets to one another, and configured to be compatible with the sheets with a plurality of prescribed sizes, the sheet thermocompression apparatus comprising:

a loading portion to be loaded with the bundle of sheets each including the adhesion layer formed thereon, the loading portion having an adjustment mechanism for adjusting a position of each of the sheets with the plurality of prescribed sizes in a longitudinal direction to a reference position;

a thermocompression unit including (i) a metallic heating sheet pressing the bundle of sheets loaded on the loading portion in a loading direction of the sheets, a longitudinal direction of the thermocompression unit being a direction along one edge of the sheets loaded on the loading portion and a short direction of the thermocompression unit being orthogonal to the longitudinal direction and the loading direction, (ii) a heating source heating the metallic heating sheet, (iii) a first temperature measuring sensor detecting a temperature of the heating source, (iv) a second temperature measuring sensor detecting the temperature of the heating source, the second temperature measuring sensor arranged at a different position from that of the first temperature measuring sensor, the first temperature measuring sensor being arranged at a more distant position from the reference position, as compared with the second temperature measuring sensor, and (v) a stay including a first leg and a second leg that apply pressure to the metallic heating sheet at two pressure-applying portions, respectively, each of the first leg and the second leg extending along the longitudinal direction so as to apply pressure to the metallic heating sheet along the longitudinal direction; and a control portion controlling a heating value of the heat generator on the basis of a measurement result of the second temperature measuring sensor, and executing a temperature raising suppression operation of suppressing temperature raising of the heating source on the basis of a measurement result of the first temperature measuring sensor, wherein the heating source is disposed, in the short direction, between the two pressure-applying portions at which the metallic heating sheet receives the pressure from the first leg and the second leg, respectively, and the heating source does not receive the pressure via the stay, and wherein, when a small-size sheet bundle having a size smaller than a maximum size among the prescribed sizes is pressurized by the metallic heating sheet, a non-contact region in which the metallic heating sheet does not contact the small-size sheet bundle is generated in the longitudinal direction.

13. The sheet thermocompression apparatus according to claim 12, wherein the control portion extends, as the temperature raising suppression operation, an interval of a pressurization operation by the metallic heating sheet of the sheets loaded on the loading portion in a case where a measurement result of the first temperature measuring sensor exceeds a prescribed threshold value.

14. A multifunction device comprising:

an image forming apparatus for forming an image on a sheet; and a post treatment apparatus including a sheet thermocompression apparatus according to claim 1 and a conveyance mechanism configured to convey the sheet, on which the image is formed by the image forming apparatus, to the sheet thermocompression apparatus.

15. A multifunction device comprising:

an image forming apparatus for forming an image on a sheet; and a post treatment apparatus including a sheet thermocompression apparatus according to claim 12 and a conveyance mechanism configured to convey the sheet, on which the image is formed by the image forming apparatus, to the sheet thermocompression apparatus.

16. The multifunction device according to claim 14, further comprising:

a control portion executing a temperature raising suppression operation of suppressing temperature raising of the heating source on the basis of a measurement result of the temperature measuring sensor, wherein the control portion extends, as the temperature raising suppression operation, an image formation interval of the sheet at the image forming apparatus in a case where a measurement result of the temperature measuring sensor exceeds a prescribed threshold value.

* * * * *